US010293458B2

(12) United States Patent
Lugg et al.

(10) Patent No.: US 10,293,458 B2
(45) Date of Patent: May 21, 2019

(54) COMPOSITE CERAMIC ABRASIVE POLISHING SOLUTION

(71) Applicant: 3M INNOVATIVE PROPERTIES COMPANY, St. Paul, MN (US)

(72) Inventors: Paul S Lugg, Woodbury, MN (US); Duy K Lehuu, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 152 days.

(21) Appl. No.: 14/915,651

(22) PCT Filed: Sep. 22, 2014

(86) PCT No.: PCT/US2014/056750
§ 371 (c)(1),
(2) Date: Mar. 1, 2016

(87) PCT Pub. No.: WO2015/047939
PCT Pub. Date: Apr. 2, 2015

(65) Prior Publication Data
US 2016/0221146 A1      Aug. 4, 2016

Related U.S. Application Data

(60) Provisional application No. 61/882,369, filed on Sep. 25, 2013.

(51) Int. Cl.
*B24B 37/24* (2012.01)
*C09K 3/14* (2006.01)
(Continued)

(52) U.S. Cl.
CPC ........... *B24B 37/24* (2013.01); *B24B 7/20* (2013.01); *B24B 37/044* (2013.01); *B24B 37/26* (2013.01);
(Continued)

(58) Field of Classification Search
CPC ....... B24B 37/044; B24B 37/24; B24B 37/26; B24B 7/20; B24D 3/10; B24D 3/18; C09G 1/02; C09K 3/1463
See application file for complete search history.

(56) References Cited

U.S. PATENT DOCUMENTS 3,036,003 A    5/1962   Verdol
3,236,770 A    2/1966   Matson
(Continued)

FOREIGN PATENT DOCUMENTS

CN    1274949    11/2000
CN    1314516    9/2001
(Continued)

OTHER PUBLICATIONS

Kasman; "Waste reduction in lapping sapphire and other compound semiconductor materials"; CS MANTECH Conference, May 17-20, 2010, Portland, Oregon, USA, 4pgs.
(Continued)

*Primary Examiner* — Marc Carlson
(74) *Attorney, Agent, or Firm* — Adam Bramwell

(57) ABSTRACT

A polishing solution includes a fluid component and a plurality of ceramic abrasive composites. The ceramic abrasive composites include individual abrasive particles uniformly dispersed throughout a porous ceramic matrix. At least a portion of the porous ceramic matrix includes glassy ceramic material. The ceramic abrasive composites are dispersed in the fluid component.

14 Claims, 3 Drawing Sheets

(51) Int. Cl.
  *B24D 3/10* (2006.01)
  *B24D 3/18* (2006.01)
  *B24B 7/20* (2006.01)
  *B24B 37/04* (2012.01)
  *B24B 37/26* (2012.01)
  *C09G 1/02* (2006.01)

(52) U.S. Cl.
  CPC ............... *B24D 3/10* (2013.01); *B24D 3/18* (2013.01); *C09G 1/02* (2013.01); *C09K 3/1463* (2013.01)

(56) References Cited

U.S. PATENT DOCUMENTS

| | | | |
|---|---|---|---|
| 3,275,554 A | 9/1966 | Wagenaar | |
| 3,414,347 A | 12/1968 | Stoltze | |
| 3,438,757 A | 4/1969 | Honnen | |
| 3,448,047 A | 6/1969 | Traise | |
| 3,454,555 A | 7/1969 | Van der Voort | |
| 3,461,172 A | 8/1969 | Previc | |
| 3,539,633 A | 11/1970 | Piasek | |
| 3,565,804 A | 2/1971 | Honnen | |
| 3,586,629 A | 6/1971 | Otto | |
| 3,591,598 A | 7/1971 | Traise | |
| 3,634,515 A | 1/1972 | Piasek | |
| 3,725,480 A | 4/1973 | Traise | |
| 3,726,882 A | 4/1973 | Traise | |
| 3,980,569 A | 9/1976 | Pindar | |
| 4,314,827 A | 2/1982 | Leitheiser | |
| 4,623,364 A | 11/1986 | Cottringer | |
| 4,744,802 A * | 5/1988 | Schwabel | B82Y 30/00 264/621 |
| 4,770,671 A * | 9/1988 | Monroe | B24D 3/34 51/293 |
| 4,881,951 A * | 11/1989 | Monroe | C04B 35/1115 51/293 |
| 5,152,917 A * | 10/1992 | Pieper | B24D 3/002 51/295 |
| 5,157,088 A | 10/1992 | Dishong | |
| 5,256,752 A | 10/1993 | Dishong | |
| 5,395,539 A | 3/1995 | Chandler | |
| 5,695,384 A * | 12/1997 | Beratan | C09G 1/02 451/28 |
| 5,855,633 A | 1/1999 | Simandl | |
| 5,958,794 A * | 9/1999 | Bruxvoort | B24B 7/228 216/88 |
| 6,194,317 B1 | 2/2001 | Kaisaki | |
| 6,241,596 B1 | 6/2001 | Osterheld | |
| 6,319,108 B1 * | 11/2001 | Adefris | B24B 7/20 451/526 |
| 6,439,967 B2 | 8/2002 | Carpenter | |
| 6,551,366 B1 * | 4/2003 | D'Souza | B24D 3/14 51/295 |
| 6,569,216 B1 * | 5/2003 | Taira | C09G 1/02 106/3 |
| 6,620,508 B2 | 9/2003 | Inoue | |
| 6,645,624 B2 * | 11/2003 | Adefris | B01J 13/043 428/402 |
| 6,702,650 B2 * | 3/2004 | Adefris | B24D 3/18 451/41 |
| 7,267,700 B2 * | 9/2007 | Collins | B24D 3/28 51/295 |
| 7,399,330 B2 * | 7/2008 | Schwabel | B24D 3/16 427/180 |
| 7,494,519 B2 | 2/2009 | Fletcher | |
| 8,162,723 B2 | 4/2012 | Spiro | |
| 2002/0095871 A1 | 7/2002 | Mcardle et al. | |
| 2002/0177390 A1 | 11/2002 | Sabde | |
| 2002/0197935 A1 * | 12/2002 | Mueller | B24B 37/044 451/36 |
| 2003/0064671 A1 * | 4/2003 | Pasqualoni | C09G 1/02 451/308 |
| 2003/0093957 A1 * | 5/2003 | Feng | B82Y 30/00 51/309 |
| 2004/0159050 A1 * | 8/2004 | Pasqualoni | C09G 1/02 51/307 |
| 2004/0187393 A1 | 9/2004 | Mutoh et al. | |
| 2005/0136669 A1 | 6/2005 | Lee | |
| 2007/0084133 A1 * | 4/2007 | Schwabel | B24D 3/16 51/307 |
| 2009/0098807 A1 * | 4/2009 | Bakshi | C09G 1/02 451/36 |
| 2009/0104851 A1 * | 4/2009 | Cherian | C09G 1/02 451/36 |
| 2010/0064593 A1 | 3/2010 | Dumm et al. | |
| 2011/0086786 A1 * | 4/2011 | Ward | C10M 171/00 508/136 |
| 2011/0204027 A1 | 8/2011 | Moriya | |
| 2012/0094487 A1 * | 4/2012 | Kranz | B24B 37/044 438/692 |
| 2013/0260650 A1 * | 10/2013 | Shinoda | C09G 1/02 451/36 |
| 2016/0229023 A1 * | 8/2016 | Lugg | B24B 37/22 |

FOREIGN PATENT DOCUMENTS

| | | |
|---|---|---|
| JP | H09279454 | 10/1997 |
| JP | 2004/034175 | 2/2004 |
| JP | 2005/146036 | 6/2005 |
| JP | 2005/294410 | 10/2005 |
| JP | 2009-161572 | 7/2009 |
| JP | 2011-040427 | 2/2011 |
| JP | 2013-082050 | 5/2013 |
| WO | WO 1998049723 | 11/1998 |
| WO | WO 2000/064630 | 11/2000 |
| WO | WO 2001/004227 | 1/2001 |
| WO | WO 2001004227 | 1/2001 |
| WO | WO 2002-38338 | 5/2002 |

OTHER PUBLICATIONS

Ng; "Advancements in Lapping and Polishing with Diamond Slurries"; CS MANTECH Conference, Apr. 23-26, 2012, Boston, Massachusetts, USA, 4 pgs.
Wilkinson, "Comprehensive Coordination Chemistry", 8pgs, (1987).
International Search Report for PCT International Application No. PCT/US2014/56750, dated Dec. 22, 2014, 3 pages.
EP Search Report, EP 14848408, dated Apr. 11, 2017 (6 pages).
EP Search Report, EP 14848991, dated Apr. 11, 2017 (6 pages).

* cited by examiner

COMPOSITE CERAMIC ABRASIVE POLISHING SOLUTION

CROSS REFERENCE TO RELATED APPLICATIONS

This application is a national stage filing under 35 U.S.C. 371 of PCT/US2014/056750, filed Sep. 22, 2014, which claims the benefit of U.S. Application No. 61/882,369, filed Sep. 25, 2013, the disclosure of which is incorporated by reference in its/their entirety herein.

FIELD

The present disclosure relates to polishing solutions useful for the polishing of substrates, and methods of using such polishing solutions.

BACKGROUND

Various articles, systems, and methods have been introduced for the polishing of ultrahard substrates. Such articles, systems, and methods are described, for example, in E. Kasman, M. Irvin, CS Mantech Conference, May 17-20, 2010, Portland Oreg.; and K. Y. Ng, T. Dumm, CS Mantech Conference, April $23^{th}$-$26^{th}$, Boston, Mass.

SUMMARY

In some embodiments, a polishing solution is provided. The polishing solution includes a fluid component and a plurality of ceramic abrasive composites. The ceramic abrasive composites include individual abrasive particles uniformly dispersed throughout a porous ceramic matrix. At least a portion of the porous ceramic matrix includes glassy ceramic material. The ceramic abrasive composites are dispersed in the fluid component.

In some embodiments, a further polishing solution is provided. The polishing solution includes a fluid component and a plurality of ceramic abrasive composites. The ceramic abrasive composites include individual abrasive particles dispersed in a porous ceramic matrix. The amount of porous ceramic matrix in the ceramic abrasive composites is between about 5 and 95 weight percent of the total weight of the porous ceramic matrix and the individual abrasive particles. At least a portion of the porous ceramic matrix includes glassy ceramic material. The ceramic abrasive composites are dispersed in the fluid component.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Definitions

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Currently, ultrahard substrate (e.g., sapphire substrates) finishing processes are fixed abrasive processes or abrasive processes that involve the use of abrasive charged metal plates followed by chemical mechanical polishing with colloidal silica slurry. The challenges of lapping and polishing ultrahard substrates have not been satisfied using known versions of such processes. For example, inadequate material removal rates, poor surface finish, sub surface damage, high cost, and overall process difficulty have all been associated with such known processes.

The present disclosure is directed to articles, systems, and methods useful for polishing ultrahard substrates that overcomes many of the aforementioned problems associated with conventional abrasive processes.

Mechanical and chemical-mechanical planarization processes remove material from the surface of substrates (e.g., semiconductor wafers, field emission displays and many other microelectronic substrates) to form a flat surface at a desired elevation in the substrates.

Figure 1:
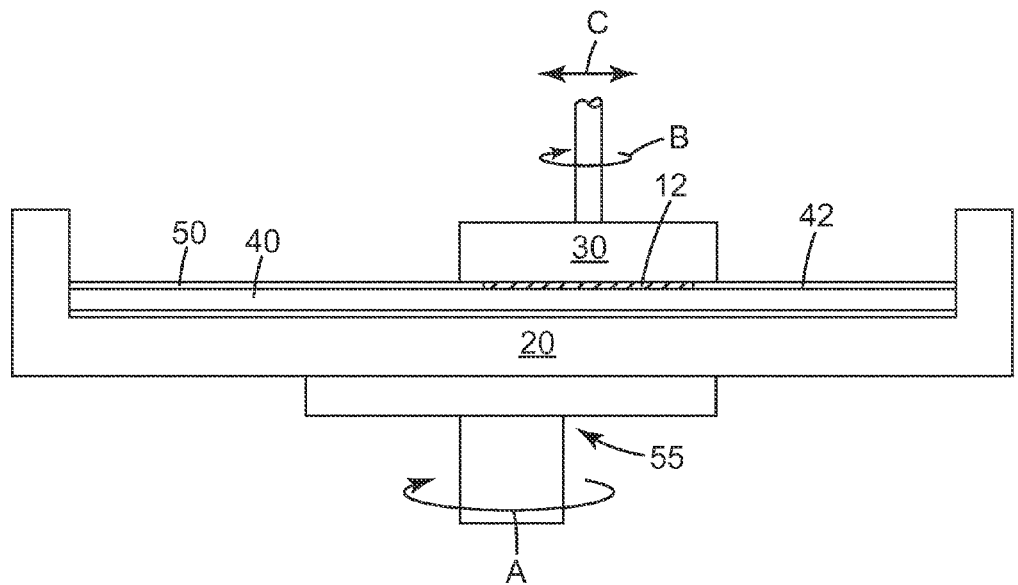
FIG. 1 illustrates a schematic of an example of a polishing system for utilizing the articles and methods in accordance with some embodiments of the present disclosure.

FIG. 1 schematically illustrates an example of a polishing system 10 for utilizing articles and methods in accordance with some embodiments of the present disclosure. As shown, the system 10 may include a platen 20, a carrier assembly 30, a polishing pad 40, and a layer of a polishing solution 50 disposed about a major surface of the polishing pad 40. During operation of the polishing system 10, a drive assembly 55 may rotate (arrow A) the platen 20 to move the polishing pad 40 to carry out a polishing operation. The polishing pad 40 and the polishing solution 50 may separately, or in combination, define a polishing environment that mechanically and/or chemically removes material from or polishes a major surface of a substrate 12. To polish the major surface of the substrate 12 with the polishing system 10, the carrier assembly 30 may press the substrate 12 against a polishing surface 42 of the polishing pad 40 in the presence of the polishing solution 50. The platen 20 (and thus the polishing pad 40) and/or the carrier assembly 30 then move relative to one another to translate the substrate 12 across the polishing surface 42 of the polishing pad 40. The carrier assembly 30 may rotate (arrow B) and optionally transverse laterally (arrow C). As a result, the abrasive particles (which may be contained in the polishing pad 40 and/or the polishing solution 50) and/or the chemicals in the polishing environment remove material from the surface of the substrate 12. It is to be appreciated that the polishing system 10 of FIG. 1 is only one example of a polishing system that may be employed in connection with the articles and methods of the present disclosure, and that other conventional polishing systems may be employed without deviating from the scope of the present disclosure.

Figure 2A:
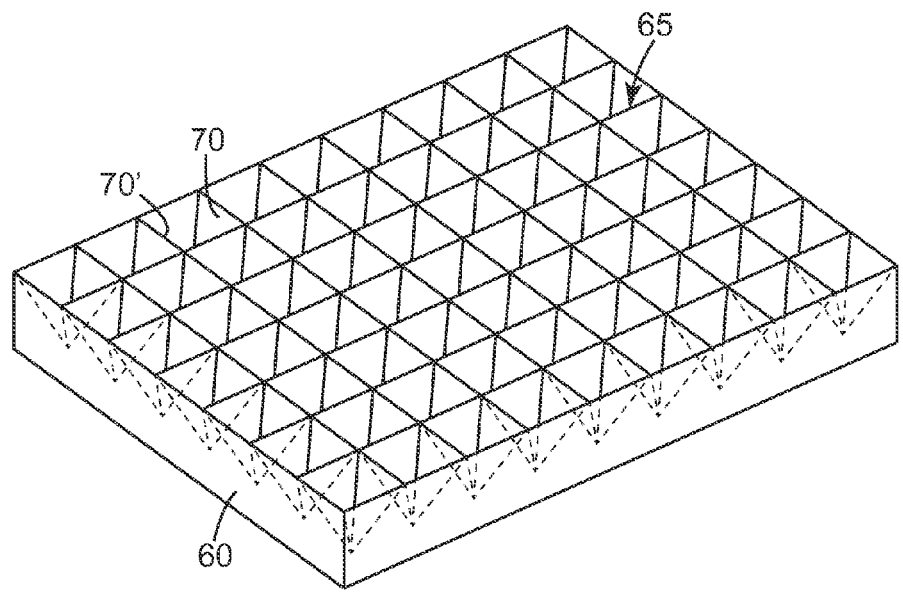
FIGS. 2A and 2B illustrate a perspective top view and a schematic cross-sectional view, respectively, of a polishing pad in accordance with some embodiments of the present disclosure.
Figure 2B:
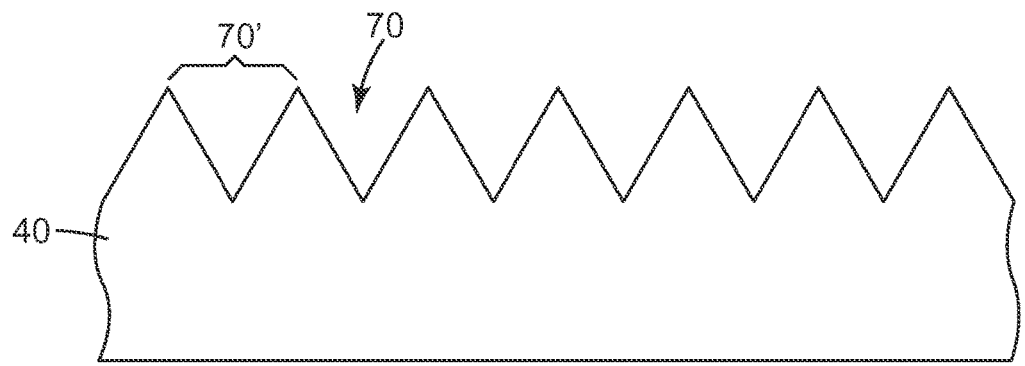

In some embodiments, the polishing pad 40 of the present disclosure may include a base layer of polymeric material having first and second major surfaces (e.g., first and second major planar surfaces). The polishing pad may further include a plurality of cavities that extend into the base layer from either or both of the first and second major surfaces of the base layer. For example, as shown in FIGS. 2A-2B, a polishing pad 40 may include a base layer 60 having a first major surface 65 and of plurality of cavities 70 that extend into the base layer 60 from the first major surface 65 (also referred to herein as the polishing surface). The cavities 70 may extend into the base layer 60 any desired distance (including entirely through the base layer 60). Alternatively, either or both of the first and second major surfaces of the base layer 60 may be continuous surfaces (i.e., not include cavities).

In illustrative embodiments, the base layer of the polishing pad 40 may be formed of a polymeric material. For example, the base layer may be formed from thermoplastics, for example; polypropylene, polyethylene, polycarbonate, polyurethane, polytetrafluoroethylene, polyethylene terephthalate, polyethylene oxide, polysulphone, polyetherketone, polyetheretherketone, polyimides, polyphenylene sulfide, polystyrene, polyoxymethylene plastic, and the like; thermosets, for example polyurethanes, epoxy resin, phenoxy resins, phenolic resins, melamine resins, polyimides and urea-formaldehyde resins, radiation cured resins, or combinations thereof. The base layer may consist essentially of only one layer of material, or it may have a multilayered construction. For example, the base layer may include a plurality of layers, or layer stack, with the individual layers of the stack being coupled to one another with a suitable fastening mechanism (e.g. adhesive). The base layer (or an individual layer of the layer stack) may have any shape and thickness. The thickness of the base layer (i.e., the dimension of the base layer in a direction normal to the first and second major surfaces) may be less than 10 mm, less than 5 mm, less than 1 mm, less than 0.5 mm, less than 0.25 mm, less than 0.125 mm, or less than 0.05 mm.

In various embodiments, the cavities 70 may have any size and shape. For example, the shape of the cavities may be selected from among a number of geometric shapes such as a cubic, cylindrical, prismatic, hemispherical, rectangular, pyramidal, truncated pyramidal, conical, truncated conical, cross, post-like with a bottom surface which is arcuate or flat, or combinations thereof. Alternatively, some or all of the cavities may have an irregular shape. In some embodiments, each of the cavities has the same shape. Alternatively, any number of the cavities may have a shape that is different from any number of the other cavities.

In various embodiments, one or more of the side or inner walls that form the cavities may be perpendicular relative to the top major surface or, alternatively, may be tapered in either direction (i.e., tapered toward the bottom of the cavity or the toward top of the cavity (toward the major surface)). The angle forming the taper can range from about 1 to 75 degrees, from about 2 to 50 degrees, from about 3 to 35 degrees, or from between about 5 to 15 degrees. The height, or depth, of the cavities can be at least 1 µm, at least 10 µm, or at least 800 µm; less than 10 mm, less than 5 mm, or less than 1 mm. The height of the cavities 70 may be the same, or one or more of the cavities may have a height that is different than any number of other cavities 70.

In some embodiments, the cavities 70 may have a cavity opening 70' defined in first the first major surface 65, the cavity openings 70' having a length (the longest dimension of the cavity in the plane of the major surface) of at least 2 µm, at least 25 µm, at least 50 µm or at least 100 µm; less than 20 mm, less than 10 mm, less than 5 mm or less than 1 mm; and a width (the shortest dimension of the cavity in the plane of the major surface) of at least 2 µm, at least 25 µm, at least 50 µm or at least 100 µm; less than 20 mm, less than 10 mm, less than 5 mm or less than 1 mm. In various embodiments, one or more of the cavity openings 70' (up to all of the cavities) is non-groove like (that is, the length to width ratio of the cavity opening 70' is 1, less than 1.5, less than 2, or less than 3).

In illustrative embodiments, one or more (up to all) of the cavities may be formed as pyramids, or truncated pyramids. Such pyramidal shapes may have three to six sides (not including the base side), although a larger or smaller number of sides may be employed.

In some embodiments, the cavities 70 can be provided in an arrangement in which the cavities 70 are in aligned rows and columns. In some instances, one or more rows of cavities 70 can be directly aligned with an adjacent row of cavities 70. Alternatively, one or more rows of cavities 70 can be offset from an adjacent row of cavities 70. In further embodiments, the cavities 70 can be arranged in a spiral, helix, corkscrew, or lattice fashion. In still further embodiments, the composites can be deployed in a "random" array (i.e., not in an organized pattern).

In various embodiments, the cavity openings 70' of the cavities 70 can abut (or nearly abut) one another or, alternatively, the cavity openings 70' may be separated from one another by some specified distance. The spacing of the cavity openings 70' can be at least 5,000 openings per linear cm, at least 400 openings per linear cm, at least 200 openings per linear cm or at least 100 openings per linear cm; less than 0.5 opening per linear cm, less than 1 opening per linear cm, less than 2 openings per linear cm or less than 10 openings per linear cm. In addition, the spacing can be varied such that the concentration of the cavity openings 70' is greater in one location than in another (e.g., the concentration may be greatest in the center of the major surface). In some embodiments, there is an area spacing density of at least 1 openings/4 $cm^2$, at least 1 openings/$cm^2$, at least 4 openings/$cm^2$, at least 100 openings/$cm^2$ or at least 1,000 openings/$cm^2$. The area spacing density of composites ranges from about 1 opening/4 $cm^2$ to 40,000 openings/$cm^2$, about 20 to 10,000 openings/$cm^2$, or about 50 to 5,000 openings/$cm^2$.

In some embodiments, in conjunction with any of the previously described embodiments, one or more (up to all) of the cavities 70 among the array of cavities may be at least partially filled with a material to facilitate performance improvements of the polishing pad 30. Suitable cavity filling materials may include ductile metals, waxes, polishing pitch, or combinations thereof. The cavity filling material may fill any portion (up to all) of the volume of a cavity. Each of the cavities may be provided with the same cavity filling material and/or filling levels, or may be provided with different filling materials and/or filling levels. By creating a cavity having a low bearing area, the effective pressure can be increased thus increasing the removal rates, as associated with the Preston equation, and the like. Filling the cavity with a resilient or ductile material such as polishing pitch or foam may have little impact on the bearing area since the particles will reflect away from the workpiece, however the "filling" may effectively supply the abrasive working particles to the point of working bearing area. If the cavity is too deep, particles may deposit in the base of the cavity and potentially be removed from the active polishing region or bearing area. Foam material such as porous polyurethane is another example of cavity filler used to create a delivery of abrasive particles to the high pressure region. Loosely bound particle additives such as plated white alumina may also be added to the cavities as a grinding aid, to enhance the removal rate or surface finish of the workpiece being polished.

In some embodiments, the polishing pad of the present disclosure may be a fixed abrasive pad. The fixed abrasive pad may be two-dimensional, i.e. a convention abrasive sheet with a layer of abrasive particles held to a backing by one or more resin or binder layers, or it may be a three-dimensional fixed abrasive, i.e. a resin or binder layer that contains abrasive particles dispersed therein, forming a resin/abrasive composite which has appropriate height to allow for the resin/abrasive composite to wear during use and/or dressing to expose a fresh layer of abrasive particles. The abrasive article may comprise a three-dimensional, textured, flexible, fixed abrasive construction having a first surface and a working surface. The working surface may comprise a plurality of precisely shaped abrasive composites. The precisely shaped abrasive composite may comprise a resin phase and an abrasive phase.

The precisely shaped abrasive composites may be arranged in an array to form the three-dimensional, textured, flexible, fixed abrasive construction. Suitable arrays include, for instance, those described in U.S. Pat. No. 5,958,794 (Bruxvoort et al.). The abrasive article may comprise abrasive constructions that are patterned. Abrasive articles available under the trade designation TRIZACT abrasive and TRIZACT diamond tile abrasives available from 3M Company, St, Paul, Minn., are exemplary patterned abrasives. Patterned abrasive articles include monolithic rows of abrasive composites precisely aligned and manufactured from a die, mold, or other techniques. Such patterned abrasive articles can abrade, polish, or simultaneously abrade and polish.

The abrasive article may include a three-dimensional, textured, flexible, fixed abrasive construction having a first surface and a working surface. In some embodiments, the first surface may further be in contact with a backing, optionally with an adhesive interposed therebetween. Any variety of backing materials are contemplated, including both flexible backings and backings that are more rigid. Examples of flexible backings include, tier instance, polymeric film, primed polymeric film, metal foil, cloth, paper, vulcanized fiber, nonwovens and treated versions thereof and combinations thereof. Examples include polymeric films of polyester, and co-polyester, micro-voided polyester, polyimide, polycarbonate, polyimide, polyvinyl alcohol, polypropylene, polyethylene, and the like. When used as a backing, the thickness of a polymeric film backing is chosen such that a desired range of flexibility is retained in the abrasive article.

The shape of each precisely shaped abrasive composite may be selected for the particular application (e.g., workpiece material, working surface shape, contact surface shape, temperature, resin phase material). The shape of each precisely shaped abrasive composite may be any useful shape, e.g., cubic, cylindrical, prismatic, right parallelepiped, pyramidal, truncated pyramidal, conical, hemispherical, truncated conical, cross, or post-like sections with a distal end. Composite pyramids may, for instance, have three, four sides, five sides, or six sides. The cross-sectional shape of the abrasive composite at the base may differ from the cross-sectional shape at the distal end. The transition between these shapes may be smooth and continuous or may occur in discrete steps. The precisely shaped abrasive composites may also have a mixture of different shapes. The precisely shaped abrasive composites may be arranged in rows, spiral, helix, or lattice fashion, or may be randomly placed. The precisely shaped abrasive composites may be arranged in a design meant to guide fluid flow and/or facilitate swarf removal.

The lateral sides forming the precisely shaped abrasive composite may be tapered with diminishing width toward the distal end. The tapered angle may be from about 1 to less than 90 degrees, for instance, from about 1 to about 75 degrees, from about 3 to about 35 degrees, or from about 5 to about 15 degrees. The height of each precisely shaped abrasive composite is preferably the same, but it is possible to have precisely shaped abrasive composites of varying heights in a single article.

The base of the precisely shaped abrasive composites may abut one another or, alternatively, the bases of adjacent precisely shaped abrasive composites may be separated from one another by some specified distance. In some embodiments, the physical contact between adjacent abrasive composites involves no more than 33% of the vertical height dimension of each contacting precisely shaped abrasive composite. This definition of abutting also includes an arrangement where adjacent precisely shaped abrasive composites share a common land or bridge-like structure which contacts and extends between facing lateral surfaces of the precisely shaped abrasive composites. The abrasives are adjacent in the sense that no intervening composite is located on a direct imaginary line drawn between the centers of the precisely shaped abrasive composites.

The precisely shaped abrasive composites may be set out in a predetermined pattern or at a predetermined location within the abrasive article. For example, when the abrasive article is made by providing an abrasive/resin slurry between a backing and mold, the predetermined pattern of the precisely shaped abrasive composites will correspond to the pattern of the mold. The pattern is thus reproducible from abrasive article to abrasive article.

The predetermined patterns may be in an array or arrangement, by which is meant that the composites are in a designed array such as aligned rows and columns, or alternating offset rows and columns. In another embodiment, the abrasive composites may be set out in a "random" array or pattern. By this is meant that the composites are not in a regular array of rows and columns as described above. It is understood, however, that this "random" array is a predetermined pattern in that the location of the precisely shaped abrasive composites is predetermined and corresponds to the mold.

In some embodiments, the resin phase may include a cured or curable organic material. The method of curing is not critical, and may include, for instance, curing via energy such as UV light or heat. Examples of suitable resin phase materials include, for instance, amino resins, alkylated urea-formaldehyde resins, melamine-formaldehyde resins, and alkylated benzoguanamine-formaldehyde resins. Other resin phase materials include, the instance, acrylate resins (including acrylates and methacrylates), phenolic resins, urethane resins, and epoxy resins. Particular acrylate resins include, for instance, vinyl acrylates, acrylated epoxies, acrylated urethanes, acrylated oils, and acrylated silicones. Particular phenolic resins include, for instance, resole and novolac resins, and phenolic/latex resins. The resins may further contain conventional fillers and curing agents such as are described, for instance, in U.S. Pat. No. 5,958,794 (Bruxvoort et al.), incorporated herein by reference.

Examples of suitable abrasive particles for the fixed abrasive pad include fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles and the like. The alumina abrasive particle may contain a metal oxide modifier. Examples of alumina-based sol gel derived abrasive particles can be found in U.S. Pat. Nos. 4,314,827; 4,623,364; 4,744,802; 4,770,671; and 4,881,951, all incorporated herein by reference. The diamond and cubic boron nitride abrasive particles may be mono crystalline or polycrystalline. Other examples of suitable inorganic abrasive particles include silica, iron oxide, chromia, ceria, zirconia, titania, tin oxide, gamma alumina, and the like.

In some embodiments, the polishing pads of the present disclosure may include one or more additional layers. For example, the polishing pad may include adhesive layers such as pressure sensitive adhesives, hot melt adhesives, or epoxies. "Sub pads" such as thermoplastic layers, e.g. polycarbonate layers, which may impart greater stiffness to the pad, may be used for global planarity. Sub pads may also include compressible material layers, e.g. foamed material layers. Sub pads which include combinations of both thermoplastic and compressible material layers may also be used. Additionally, or alternatively, metallic films for static elimination or sensor signal monitoring, optically clear layers for light transmission, foam layers for finer finish of the workpiece, or ribbed materials for imparting a "hard band" or stiff region to the polishing surface may be included.

As will be appreciated by those skilled in the art, the polishing pads of the present disclosure can be formed according to a variety of methods including, e.g., molding, extruding, embossing and combinations thereof.

In some embodiments, the polishing solutions 50 (commonly referred to as a "slurry") of the present disclosure may include a fluid component having abrasive composites dispersed and/or suspended therein.

In various embodiments, the fluid component may be non-aqueous or aqueous. A non-aqueous fluid is defined as having at least 50% by weight of a non-aqueous fluid, e.g., an organic solvent. An aqueous fluid is defined as having at least 50% by weight water. Non aqueous fluid components may include alcohols; e.g. ethanol, propanol, isopropanol, butanol, ethylene glycol, propylene glycol, glycerol, polyethylene glycol, triethylene glycol; acetates, e.g. ethyl acetate, butyl acetate; ketones, e.g. methyl ethyl ketone, organic acids, e.g., acetic acid; ethers; triethanolamine; complexes of triethanolamine such as silitrane or boron equivalents, or combinations thereof. Aqueous fluid components may include (in addition to water) non-aqueous fluid components, including any of the non-aqueous fluids described above. The fluid component may consist essentially of water, or the amount of water in the fluid component may be at least 50% by weight, at least 70% by weight, at least 90% by weight or at least 95% by weight. The fluid component may consist essentially of a non-aqueous fluid, or the amount of non-aqueous fluid in the fluid component may be at least 50% by weight, at least 70% by weight, at least 90% by weight or at least 95% by weight. When the fluid component includes both aqueous and non-aqueous fluids, the resulting fluid component may be homogeneous, i.e. a single phase solution.

In illustrative embodiments, the fluid component may be selected such that the abrasive composite particles are insoluble in the fluid component.

In some embodiments, the fluid component may further include one or more additives such as, for example, dispersion aids, rheology modifiers, corrosion inhibitors, pH modifiers, surfactants, chelating agents/complexing agents, passivating agents, foam inhibitor, and combinations thereof. Dispersion aids are often added to prevent the sagging, settling, precipitation, and/or flocculation of the agglomerate particles within the slurry, which may lead to inconsistent or unfavorable polishing performance. Useful dispersants may include amine dispersants, which are reaction products of relatively high molecular weight aliphatic or alicyclic halides and amines, such as polyalkylene polyamines and Mannich dispersants, which are the reaction products of alkyl phenols in which the alkyl group contains at least 30 carbon atoms with aldehydes (especially formaldehyde) and amines (especially polyalkylene polyamines). Examples of amine dispersants are described in U.S. Pat. Nos. 3,275,554; 3,438,757; 3,454,555, and 3,565,804, all incorporated herein by reference. Examples of Mannich dispersants are described in U.S. Pat. Nos. 3,036,003; 3,236,770; 3,414,347; 3,448,047; 3,461,172; 3,539,633; 3,586,629; 3,591,598; 3,634,515; 3,725,480; 3,726,882, and 3,980,569, incorporated herein by reference.

Dispersive aids which provide steric stabilization may be used, such as those available under the trade designation SOLSPERSE, CARBOSPERSE and IRCOSPERSE, from Lubrizol Corporation, Wickliffe, Ohio. Additional dispersants include DISPERBYK additives such as DISPERBYK 180 from BYK Additives and Instruments, Wesel, Germany and DISPERS additives, including TEGO DISPERS 652, TEGO DISPERS 656 and TEGO DISPERSE 670, from Evonik Industries Hopewell, Va. Dispersion aids may be used alone or in combination of two or more.

Rheology modifiers may include shear thinning and shear thickening agents. Shear-thinning agents may include polyamide waxes coated on polyolefin polymer material available under the trade designation DISPARLON from King Industries, Inc, Norwalk, Conn., including DISPARLON AQH-800, DISPARLON 6100, DISPARLON BB-102. Certain clays, such as Montmorillonite clay, may also be added as a shear thinning agent. Rheology modifiers may be used alone or in combination of two or more.

Thickening agents may include fumed silica, such as those available under the trade designation CAB-O-SIL from Cabot Corporation, Boston, Mass. and AEROSIL from Evonik Industires; SOLTHIX RHEOLOGY MODIFIERS and IRCOGEL from Lubrizol Corporation; water-soluble polymers, e.g. polyvinylpyrrolidone, polyethyleneimine, cellulose derivatives (hydroxypropylmethyl cellulose, hydroxyethyl cellulose, cellulose acetate butyrate, etc.) polyvinyl alcohol, poly(meth)acrylic acid, polyethylene glycol, poly(meth)acrylamide, polystyrene sulfonate, or any combinations thereof; non-aqueous polymers, e.g. polyolefins, styrene/maleic ester copolymers, and similar polymeric substances including homopolymers, copolymers and graft copolymers. The agents may comprise a nitrogen-containing methacrylate polymer, for example, a nitrogen-containing methacrylate polymer derived from methyl methacrylate and dimethylaminopropyl amine. Examples of commercially available materials include polyisobutylenes, such as INDOPAL from BP, London, England and or PARAPOL from ExxonMobil, Irving, Tex.; olefin copolymers, such as LUBRIZOL 7060, 7065, and 7067 from Lubrizol Corporation and LUCANT HC-2000L and LUCANT HC-600 from Mitsui Chemicals, Tokyo, Japan; hydrogenated styrene-diene copolymers, such as SHELLVIS 40 and SHELLVIS 50 from Shell Chemicals, Houston, Tex. and LZ 7308 and LZ 7318 from Lubrizol Corporation; styrene/maleate copolymers, such as LZ 3702 and LZ 3715 from Lubrizol Corporaton; polymethacrylates, such as those available under the trade designation VISCOPLEX from Evonik RohMax USA, Inc., Horsham, Pa., HITEC series of viscosity index improvers from Afton Chemical Corporation, Richmond, Va., and LZ 7702, LZ 7727, LZ7725 and LZ 7720C from Lubrizol Corporation; olefin-graft-polymethacrylate polymers such as VISCOPLEX 2-500 and VISCOPLEX 2-600 from Evonik RohMax USA, Inc.; and hydrogenated polyisoprene star polymers, such as SHELLVIS 200 and SHELLVIS 260, from Shell Chemicals. Other materials include methacrylate polymers with radial or star architecture, such as ASTERIC polymers from Lubrizol Corporation. Viscosity modifiers that may be used are described in U.S. Pat. Nos. 5,157,088; 5,256,752 and 5,395,539, incorporated herein by reference. Viscosity modifiers may be used alone or in combination of two or more.

Corrosion inhibitors that may be added to the fluid component include alkaline materials, which can neutralize the acidic byproducts of the polishing process that can degrade metal such as triethanolamine, fatty amines, octylamine octanoate, and condensation products of dodecenyl succinic acid or anhydride and a fatty acid such as oleic acid with a polyamine. Corrosions inhibitors may be used alone or in combination of two or more.

Suitable pH modifiers which may be used include alkali metal hydroxides, alkaline earth metal hydroxides, basic salts, organic amines, ammonia, and ammonium salts. Examples include potassium hydroxide, sodium hydroxide, calcium hydroxide, ammonium hydroxide, sodium borate, ammonium chloride, triethylamine, triethanolamine, diethanolamine, and ethylenediamine. Some pH modifiers, such as diethanolamine and triethanolamine, may also be capable of forming chelate complexes with metal impurities such as aluminum ions during metal polishing. Buffer systems may also be employed. The buffers can be adjusted to span the range from acidic to near-neutral to basic. Polyprotic acids act as buffers, and when fully or partially neutralized with ammonium hydroxide to make ammonium salts, they are representative examples including systems of phosphoric acid-ammonium phosphate; polyphosphoric acid-ammonium polyphosphate; the boric acid-ammonium tetraborate; boric acid-ammonium pentaboratepH modifiers may be used alone or in combination of two or more. Other buffers include tri- and potyprotic protolytes and their salts (e.g., ammonium salts). These may include ammonium ion buffer systems based on the following protolytes, all of which have at least one pKa greater than 7: aspartic acid, glutamic acid, histidine, lysine, arginine, ornithine, cysteine, tyrosine, and carnosine.

Surfactants that may be used include ionic and nonionic surfactants. Nonionic surfactants may include polymers containing hydrophilic and hydrophobic segments, such as polypropylene glycol)-block-poly(ethylene glycol)-block-polypropylene glycol) available under the trade designation PLURONIC from BASF Corporation, Florham Park, N.J.; poly(ethylene)-block-poly(ethylene glycol) available under the trade designation BRIJ from Croda International PLC, Edison, N.J.; nonylphenol ethoxylate available under the trade designation TERGITOL from Dow Chemical, Midland, Mich. and polyethylene glycol sorbitan monostearate available under the trade designation TWEEN 60 and other TWEEN surfactants from Croda International PLC.

Ionic surfactants may include both cationic surfactants and anionic surfactants. Cationic surfactants include quaternary ammonium salts, sulfonates, carboxylates, linear alkylamines. alkylbenzene sulfonates (detergents), (fatty acid) soaps, lauryl sulfates, di-alkyl sulfosuccinate and lignosulfonates. Anionic Surfactants are dissociated in water in an amphiphilic anion, and a cation, which is in general an alkaline metal (Na+, K+) or a quaternary ammonium. Types include Laureth-carboxylic acid such as AKYPO RLM-25 from KAO Chemicals, Kao Specialties Americas LLC, High Point, N.C. Surfactants may be used alone or in combination of two or more.

Complexing agents, such as ligands and chelating agents, may be included in the fluid component, particularly when the application relates to metal finishing or polishing, where metal swarf and or metal ions may be present in the fluid component during use. The oxidation and dissolution of metal can be enhanced by the addition of complexing agents. These compounds can bond to metal to increase the solubility of metal or metal oxides in aqueous and non-aqueousliquids, as generally described in Cotton & Wilkinson; and Hathaway in Comprehensive Coordination Chemistry, Vol. 5; Wilkinson, Gillard, McCleverty, Eds. Suitable additives that may be added to or used in the liquid component include monodentate complexing agents, such as ammonia, amines, halides, pseudohalides, carboxylates, thiolates, and the like also called ligands. Other additives that may be added to the working liquid include multidentate complexing agents, typically multidentate amines. Suitable multidentate amines include ethylenediamine, diethylene-triamine, triethylenetetramine, or combinations thereof. Combinations of the two monodentate and polydentate complexing agents include amino acids such as glycine, and common analytical chelating agents such as EDTA-ethylenediaminetetraacetie acid and its numerous analogs. Additional chelators include: polyphosphates, 1,3-diketones, aminoalcohols, aromatic heterocyclic bases, phenols, aminophenols, oximes, Schiff bases, and sulfur compounds. Examples of suitable complexing agents (particularly in the case when metal oxide surfaces are being polished) include ammonium salts such as $NH_4HCO_3$, tannic acid, catechol, $Ce(OH)(NO)_3$; $Ce(SO_4)_2$, phthalic acid, salicyclic acid and the like.

Complexing agents may include carboxylic acids and salts thereof that having one carboxyl group (i.e., monofunctional carboxylic acids) or a plurality of carboxylic acid groups (i.e., multifunctional carboxylic acids), e.g., difunctional carboxylic acids (i.e., dicarboxylic acids) and trifunctional carboxylic acids (i.e., triearboxylic acids). As used herein, the terms "monofunctional", "difunctional", "trifunctional," and "multifunctional" refer to the number of carboxyl groups on the acid molecule. Complexing agents may include simple carboxylic acids, which consist of carbon, hydrogen, and one or more carboxyl groups. Exemplary monofunctional simple carboxylic acids include, e.g., formic, acetic, propionic, butyric, isobutyric acid, 3-butenoic acid, capric, lauric, stearic, linoleic, linolenic, phenylacetic, benzoic, and toluic acids. Exemplary multifunctional simple carboxylic acids include, e.g., oxalic, malonic, methylmalonic, succinic, glutaric, adipic, maleic, fumaric, phthalic, isophthalic, and terephthalic acids. Complexing agents may include substituted carboxylic acids contain one or more substituents, e.g., halides, hydroxyl groups, amino groups, ether groups, and/or carbonyl groups in addition to the one or more carboxy groups. Hydroxycarboxylic acids, which comprise one or more hydroxyl groups, are one class of substituted carboxylic acid. Exemplary hydroxy-carboxylic acids include monofunctional hydroxy-carboxylic acids and multifunctional hydroxy-carboxylic acids. Exemplary monofunctionat hydroxy-carboxylic acids include glyceric acid (i.e., 2,3-dihydroxypropanoic acid), glycolic acid, lactic acid (e.g., L-lactic, D-lactic, and DL-lactic acids), hydroxy-butanoic acid, 3-hydroxypropionic acid, gluconic acid and methyllactic acid (i.e., 2-hydroxyisobutyric acid). Exemplary multifunctional hydroxy-carboxylic acids include malic acid and tartaric acid (difunctionat hydroxy-carboxylic acids) and citric acid (a trifunctional hydroxy-carboxylic acid). Complexing agents may be used alone or in combination of two or more.

Passivating agents may be added to the fluid component to create a passivating layer on the substrate being polished, thereby altering the removal rate of a given substrate or adjusting the removal rate of one material relative to another material, when the substrate contains a surface that includes two or more different materials. Passivating agents known in the art for passivating metal substrates may be used, including benzotriazole and corresponding analogs. Passivating agents known to passivate inorganic oxide substrates, include amino acids, e.g. glycine, aspartic acid, glutamic acid, histidine, lysine, proline, arginine, cysteine, and tyronsine may be used. Additionally, ionic and non-ionic surfactants may also function as passivating agents. Passivating agents may be used alone or in combination of two or more, e.g. an amino acid and a surfactant.

Foam inhibitors that may be used include silicones; copolymers of ethyl acrylate and 2-ethylhexylacrylate, which can optionally further include vinyl acetate; and demulsifiers including trialkyl phosphates, polyethylene glycols, polyethylene oxides, polypropylene oxides and (ethylene oxide-propylene oxide) polymers. Foam inhibitors may be used alone or in combination of two or more. Other additives that may be useful in the fluid component include oxidizing and/or bleaching agents such as, e.g. hydrogen peroxide, nitric acid, and transition metal complexes such as ferric nitrate; lubricants; biocides; soaps and the like.

In various embodiments, the concentration of an additive class, i.e. the concentration of one or more additives from a single additive class, in the polishing solution may be at least about 0.01 wt. %, at least about, 0.1 wt. %, at least about 0.25 wt. %, at least about 0.5 or at least about 1.0 wt. %; less than about 20 wt. %, less than about 10 wt. %, less than about 5 wt. % or less than about 3 wt % based on the weight of the polishing solution.

In illustrative embodiments, the abrasive composites of the present disclosure may include porous ceramic abrasive composites. The porous ceramic abrasive composites may include individual abrasive particles dispersed in a porous ceramic matrix. As used herein the term "ceramic matrix" includes both glassy and crystalline ceramic materials. These materials generally fall within the same category when considering atomic structure. The bonding of the adjacent atoms is the result of process of electron transfer or electron sharing. Alternatively, weaker bonds as a result of attraction of positive and negative charge known as secondary bond can exist. Crystalline ceramics, glass and glass ceramics have ionic and covalent bonding. Ionic bonding is achieved as a result of electron transfer from one atom to another. Covalent bonding is the result of sharing valence electrons and is highly directional. By way of comparison, the primary bond in metals is known as a metallic bond and involves non-directional sharing of electrons. Crystalline ceramics can be subdivided into silica based silicates (such as fireclay, mullite, porcelain, and Portland cement), non-silicate oxides (e.g., alumna, magnesia, $MgAl_2O_4$, and zirconia) and non-oxide ceramics (e.g., carbides, nitrides and graphite). Glass ceramics are comparable in composition with crystalline ceramics. As a result of specific processing techniques, these materials do not have the long range order crystalline ceramics do. Glass ceramics are the result of controlled heat-treatment to produce at least about 30% crystalline phase and up to about 90% crystalline phase or phases.

In illustrative embodiments, at least a portion of the ceramic matrix includes glassy ceramic material. In further embodiments, the ceramic matrix includes at least 50% by weight, 70% by weight, 75% by weight, 80% by weight, or 90% by weight glassy ceramic material. In one embodiment, the ceramic matrix consists essentially of glassy ceramic material.

In various embodiments, the ceramic matrixes may include glasses that include metal oxides, for example, aluminum oxide, boron oxide, silicon oxide, magnesium oxide, sodium oxide, manganese oxide, zinc oxide, and mixtures thereof. A ceramic matrix may include alumina-borosilicate glass including $Si_2O$, $B_2O_3$, and $Al_2O_3$. The alumina-borosilicate glass may include about 18% $B_2O_3$, 8.5% $Al_2O_3$, 2.8% BaO, 1.1% CaO, 2.1% $Na_2O$, 1.0% $Li_2O$ with the balance being $Si_2O$. Such an alumina-borosilicate glass is commercially available from Specialty Glass Incorporated, Oldsmar Fla.

As used herein the term "porous" is used to describe the structure of the ceramic matrix which is characterized by having pores or voids distributed throughout its mass. The pores may be open to the external surface of the composite or sealed. Pores in the ceramic matrix are believed to aid in the controlled breakdown of the ceramic abrasive composites leading to a release of used (i.e., dull) abrasive particles from the composites. The pores may also increase the performance (e.g., cut rate and surface finish) of the abrasive article, by providing a path for the removal of swarf and used abrasive particles from the interface between the abrasive article and the workpiece. The voids may comprise from about at least 4 volume % of the composite, at least 7 volume % of the composite, at least 10 volume % of the composite, or at least 20 volume % of the composite; less than 95 volume % of the composite, less than 90 volume % of the composite, less than 80 volume % of the composite, or less than 70 volume % of the composite. A porous ceramic matrix may be formed by techniques well known in the art, for example, by controlled firing of a ceramic matrix precursor or by the inclusion of pore forming agents, for example, glass bubbles, in the ceramic matrix precursor.

In some embodiments, the abrasive particles may include diamond, cubic boron nitride, fused aluminum oxide, ceramic aluminum oxide, heated treated aluminum oxide, silicon carbide, boron carbide, alumina zirconia, iron oxide, ceria, garnet, and combinations thereof. In one embodiment, the abrasive particles may include or consist essentially of diamond. Diamond abrasive particles may be natural or synthetically made diamond. The diamond particles may have a blocky shape with distinct facets associated with them or, alternatively, an irregular shape. The diamond particles may be mono-crystalline or polycrystalline such as diamond commercially available under the trade designation "Mypolex" from Mypodiamond Inc., Smithfield Pa. Monocrystalline diamond of various particles size may be obtained from Diamond Innovations, Worthington, Ohio. Polycrystalline diamond may be obtained from Tomei Corporation of America, Cedar Park, Tex. The diamond particles may contain a surface coating such as a metal coating (nickel, aluminum, copper or the like), an inorganic coating (for example, silica), or an organic coating.

In some embodiments, the abrasive particles may include a blend of abrasive particles. For example, diamond abrasive particles may be mixed with a second, softer type of abrasive particles. In such instance, the second abrasive particles may have a smaller average particle size than the diamond abrasive particles.

In illustrative embodiments, the abrasive particles may be uniformly (or substantially uniformly) distributed throughout the ceramic matrix. As used herein, "uniformly distributed" means that the unit average density of abrasive particles in a first portion of the composite particle does not vary by more than 20%, more than 15%, more than 10%, or more than 5% when compared with any second, different portion of the composite particle. This is in contrast to, for example, an abrasive composite particle having abrasive particles concentrated at the surface of the particle.

In various embodiments, the abrasive composite particles of the present disclosure may also include optional additives such as fillers, coupling agents, surfactants, foam suppressors and the like. The amounts of these materials may be selected to provide desired properties. Additionally, the abrasive composite particles may include (or have adhered to an outer surface thereof) one or more parting agents. As will be discussed in further detail below, one or more parting agents may be used in the manufacture of the abrasive composite particles to prevent aggregation of the particles. Useful parting agents may include, for example, metal oxides (e.g, aluminum oxide), metal nitrides (e.g., silicon nitride), graphite, and combinations thereof.

In some embodiments, the abrasive composites useful in the articles and methods of the present disclosure may have an average size (average major axial diameter or longest straight line between two points on a composite) of about at least 5 µm, at least 10 µm, at least 15 µm, or at least 20 µm; less than 1,000 µm, less than 500 µm, less than 200 µm, or less than 100 µm.

In illustrative embodiments, the average size of the abrasive composites is at least about 3 times the average size of the abrasive particles used in the composites, at least about 5 times the average size of the abrasive particles used in the composites, or at least about 10 times the average size of the abrasive particles used in the composites; less than 30 times the average size of the abrasive particles used in the composites, less than 20 times the average size of the abrasive particles used in the composites, or less than 10 times the average size of the abrasive particles used in the composites. Abrasive particles useful in the articles and methods of the present disclosure may have an average particle size (average major axial diameter (or longest straight line between two points on a particle)) of at least about 0.5 µm, at least about 1 µm, or at least about 3 µm; less than about 300 µm, less than about 100 µm, or less than about 50 µm. The abrasive particle size may be selected to, for example, provide a desired cut rate and/or desired surface roughness on a workpiece. The abrasive particles may have a Mohs hardness of at least 8, at least 9, or at least 10.

In various embodiments, the weight of abrasive particles to the weight of glassy ceramic material in the ceramic matrix of the ceramic abrasive composites is at least about 1/20, at least about 1/10, at least about 1/6, at least about 1/3, less than about 30/1, less than about 20/1, less than about 15/1 or less than about 10/1.

Figure 3:
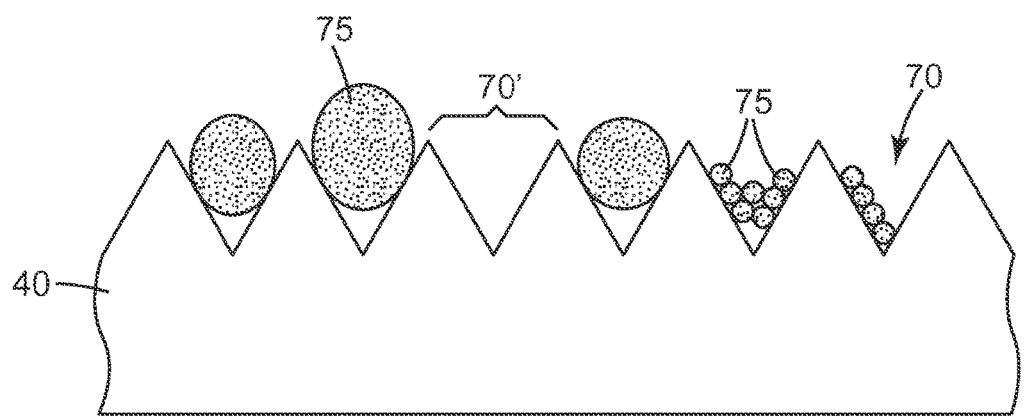
FIG. 3 illustrates a schematic cross-sectional view of a polishing pad having a plurality of cavities with one or more abrasive composite particles at least partially disposed therein in accordance with some embodiments of the present disclosure.

Referring now to FIG. 3, in various embodiments, the abrasive composites of the present disclosure may be sized and shaped relative to the size and shape of the cavities 70 of the polishing pad 40 such that one or more (up to all) of the abrasive composites may be at least partially disposed within a cavity 70. More specifically, as shown in FIG. 3, the abrasive composites 75 may be sized and shaped relative to the cavities 70 such that one or more (up to all) of the abrasive composites 75, when fully received by a cavity 70, has at least a portion that extends beyond the cavity opening 70'. As used herein, the phrase "fully received," as it relates to the position of a composite within a cavity, refers to the deepest position the composite may achieve within a cavity upon application of a non-destructive compressive force (such as that which is present during a polishing operation, as discussed below). In this manner, as will be discussed in further detail below, during a polishing operation, the abrasive composite particles of the polishing solution may be received in and retained by (e.g., via frictional forces) the cavities 70, thereby functioning as an abrasive working surface.

In various embodiments, the amount of porous ceramic matrix in the ceramic abrasive composites is at least 5, at least 10, at least 15, at least 33, less than 95, less than 90, less than 80, or less than 70 weight percent of the total weight of the porous ceramic matrix and the individual abrasive particles, where the ceramic matrix includes any fillers, adhered parting agent and/or other additives other than the abrasive particles.

In various embodiments, the abrasive composite particles may be precisely-shaped or irregularly shaped (i.e., non-precisely-shaped). Precisely-shaped ceramic abrasive composites may be any shape (e.g., cubic, block-like, cylindrical, prismatic, pyramidal, truncated pyramidal, conical, truncated conical, spherical, hemispherical, cross, or post-like). The abrasive composite particles may be a mixture of different abrasive composite shapes and/or sizes. Alternatively, the abrasive composite particles may have the same (or substantially the same) shape and/or size. Non-precisely shaped particles include spheroids, which may be formed from, for example, a spray drying process.

In various embodiments, the concentration of the abrasive composites in the fluid component may be at least 0.065 wt. %, at least 0.16 wt. %, at least 0.33 or at least 0.65 wt. %; less than 6.5 wt. %, less than 4.6 wt. %, less than 3.0 wt. % or less than 2.0 wt %. In some embodiments, both the ceramic abrasive composites and the parting agent used in their fabrication can be included in the fluid component. In these embodiments the concentration of the abrasive composites and the parting agent in the fluid component may be at least 0.1 wt. %, at least 0.25 wt. %, at least 0.5 or at least 1.0 wt. %; less than 10 wt. %, less than 7 wt. %, less than 5 wt. % or less than 3 wt.

The abrasive composite particles of the present disclosure may be formed by any particle forming processes including, for example, casting, replication, microreplication, molding, spraying, spray-drying, atomizing, coating, plating, depositing, heating, curing, cooling, solidification, compressing, compacting, extrusion, sintering, braising, atomization, infiltration, impregnation, vacuumization, blasting, breaking (depending on the choice of the matrix material) or any other available method. The composites may be formed as a larger article and then broken into smaller pieces, as for example, by crushing or by breaking along score lines within the larger article. If the composites are formed initially as a larger body, it may be desirable to select for use fragments within a narrower size range by one of the methods known to those familiar with the art. In some embodiments, the ceramic abrasive composites may include vitreous bonded diamond agglomerates produced generally using the method of U.S. Pat. Nos. 6,551,366 and 6,319,108, which is herein incorporated by reference in its entirety.

Generally, a method for making the ceramic abrasive composite includes mixing an organic binder, solvent, abrasive particles, e.g. diamond, and ceramic matrix precursor particles, e.g. glass frit; spray drying the mixture at elevated temperatures producing "green" abrasive/ceramic matrix/binder particles; the "green" abrasive/ceramic matrix/binder particles are collected and mixed with a parting agent, e.g. plated white alumina; the powder mixture is then annealed at a temperature sufficient to vitrify the ceramic matrix material that contains the abrasive particles while removing the binder through combustion; forming the ceramic abrasive composite. The ceramic abrasive composites can optionally be sieved to the desired particle size. The parting agent prevents the "green" abrasive/ceramic matrix/binder particles from aggregating together during the vitrifying process. This enables the vitrified, ceramic abrasive composites to maintain a similar size as that of the "green" abrasive/ceramic matrix/binder particles formed directly out of the spray drier. A small weight fraction, less than 10%, less 5% or even less than 1% of the parting agent may adhere to the outer surface of the ceramic matrix during the vitrifying process. The parting agent typically has a softening point (for glass materials and the like), or melting point (for crystalline materials and the like), or decomposition temperature, greater than the softening point of the ceramic matrix, wherein it is understood that not all materials have each of a melting point, a softening point, or a decomposition temperature. For a material that does have two or more of a melting point, a softening point, or a decomposition temperature, it is understood that the lower of the melting point, softening point, or decomposition temperature is greater than the softening point of the ceramic matrix. Examples of useful parting agents include, but are not limited to, metal oxides (e.g., aluminum oxide), metal nitrides (e.g. silicon nitride) and graphite.

In some embodiments, the abrasive composite particles of the present disclosure may be surface modified (e.g., covalently, ionically, or mechanically) with reagents which will impart properties beneficial to abrasive slurries. For example, surfaces of glass can be etched with acids or bases to create appropriate surface pH. Covalently modified surfaces can be created by reacting the particles with a surface treatment comprising one or more surface treatment agents. Examples of suitable surface treatment agents include silanes, titanates, zirconates, organophosphates, and organosulfonates. Examples of silane surface treatment agents suitable for this invention include oetyltriethoxysilane, vinyl silanes (e.g., vinyltritnethoxysilane and vinyl triethoxysitane), tetramethyl chloro silane, methyltrimethoxysilane, methyltriethoxysilane, propyltrimethoxysilane, propyltrimethoxysilane, tris[3-(trimethoxysityl)propyl]isocyanurate, vinyl-tris-(2-methoxyethoxy)silane, gamm-methacryloxypropyltrimethoxysilane, beta-(3,4-epoxycyclohexyl) ethyltrimethoxysilane, gamma-glycidoxypropyltrimethhoxysilane gamma-mercaptopropyltrimethoxysilane, gamma-aminopropyltrimethoxysilane, gamma-aminopropyltrimethoxysilane, N-beta-(aminoethyl)-gamma-aminopropyltrimethoxysilane, bis-(gamma-trimethoxylpropyl)amine, N-phenyl-gamma-aminopropyltrimethoxysilane, gamma-ureidopropyltrialkoxysilane, gamma-ureidopropyltrimethoxysilane, acryloxyalkyl trimethoxysilane, methaeryloxyalkyl trimethoxysilane, phenyl trichlorosilane, phenyltrimethoxysilane, phenyl triethoxysilane, SILQUEST A1230 proprietary non-ionic silane dispersing agent (available from Momentive, Columbus, Ohio) and mixtures thereof. Examples of commercially available surface treatment agents include SILQUEST A174 and SILQUEST A1230 (available from Momentive). The surface teat gent agents may be used to adjust the hydrophobic or hydrophilic nature of the surface it is modifying. Vinyl silanes can be used to provide an even more sophisticated surface modification by reacting the vinyl group w/another reagent. Reactive or inert metals can be combined with the glass diamond particles to chemically or physically change the surface. Sputtering, vacuum evaporation, chemical vapor deposition (CVD) or molten metal techniques can be used.

The present disclosure further relates to methods of polishing substrates. The methods may be carried out using a polishing system such as that described with respect to FIG. 1, or with any other conventional polishing system, e.g. single or double sided polishing and lapping. In some embodiments, a method of polishing substrate may include providing a substrate to be polished. The substrate may be any substrate for which polishing and/or planarization is desirable. For example, the substrate may be a metal, metal alloy, metal oxide, ceramic, or polymer (commonly in the form of a semiconductor wafer or optical lens). In some embodiments, the methods of the present disclosure may be particularly useful for polishing ultrahard substrates such as sapphire (A, R, or C planes), silicon, silicon carbide, quartz, or silicate glasses. The substrate may have one or more surfaces to be polished.

In various embodiments, the method may further include providing a polishing pad and a polishing solution. The polishing pad and polishing solution may be the same as or similar to any of the polishing pads and the polishing solutions described above.

In some embodiments, the method may further include contacting a surface of the substrate with the polishing pad and the polishing solution while there is relative motion between the polishing pad and the substrate. For example, referring again to the polishing system of FIG. 1, the carrier assembly 30 may apply pressure to the substrate 12 against a polishing surface of the polishing pad 40 in the presence of the polishing solution 50 as the platen 20 is moved (e.g., translated and/or rotated) relative to the carrier assembly 30. Additionally, the carrier assembly 30 may be moved (e.g., translated and/or rotated) relative to the platen 20. As a result of the pressure and relative motion, at least some (up to all)

of the abrasive composite particles of the polishing solution 50 may be transported into and retained within a cavity 70 of the polishing pad to form an abrasive working surface. Continued pressure and relative motion between the substrate and the polishing surface may then result in polishing of the substrate.

In illustrative embodiments, the systems and methods of the present disclosure are particularly suited for the finishing of ultra hard substrates such as sapphire, A, R, or C planes. Finished sapphire crystals, sheets or wafers are useful, for example, in the light emitting diode industry and cover layer for mobile hand held devices. In such applications, the systems and methods provide persistent removal of material. Furthermore, it has been discovered that systems and methods of the present disclosure can provide a removal rate commensurate with that achieved with large abrasive particle sizes conventionally employed, while providing a surface finish comparable to that achieved with small particle sizes conventionally employed. Still further, the systems and methods of the present disclosure are capable of providing persistent removal rates without extensive dressing of the pad, such as required with fixed abrasive pads.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

Materials

| Abbreviation or Trade Name | Description |
|---|---|
| MCD1.5 | A 1.5 micron monocrystalline diamond, available from Diamond Innovations, Worthington, Ohio. |
| MCD3 | A 3 micron monocrystalline diamond, available from Diamond Innovations. |
| MCD6 | A 6 micron monocrystalline diamond, available from Diamond Innovations. |
| MCD9 | A 9 micron monocrystalline diamond, available from Diamond Innovations. |
| PCD5 | A 5 micron polycrystalline diamond, available from Tomei Corporation of America, Cedar Park, Texas. |
| GF* | A glass frit having a particle size of about 10.6 microns, available under the trade designation "SP 1086" from Specialty Glass, Inc., Oldsmar, Florida. |
| AlOx | A 3 micron plated white alumina, used as a parting agent, available under the trade designation "PWA 3" from Fujimi Inc., Kiyosu, Japan. |
| Standex230 | Dextrin, available under the trade designation "STANDEX 230" from A. E. Staley Manufacturing Company, Decatur, Illinois. |
| HEC | Hydroxy ethyl cellulose, available from Sigma-Aldrich Co. LLC, St. Louis, Missouri. |
| EG | Anhydrous ethylene glycol, available from Sigma-Aldrich Co. LLC. |
| Glyc | Glycerol, available from Sigma-Aldrich Co. LLC. |
| Sabrelube | An aqueous coolant, available under the trade designation "SABRELUBE 9016" from Chemetall, New Providence, New Jersey. |

*Particle size is the mean measured by conventional laser light scattering.

Test Methods and Preparation Procedures

Polishing Test-1

Polishing was conducted using a Model 6Y-1 polisher, available from Strasbaugh, Long Beach Calif., modified such that the load to the head was applied from a stack of weights. The load was applied using weights of 20 lbs (9.1 kg). A 12 inch (30.5 cm) diameter pad was mounted to the 12 inch (30.5 cm) diameter platen of the polisher using a double sided adhesive tape. The pad was mounted such that the textured surface would contact the wafer being polished. The platen was rotated at 60 rpm. The head of the polisher was rotated at 40 rpm, without a sweeping motion. A carrier comprising three, equilateral, triangular shaped recesses, each sized to hold a 5.1 cm diameter wafer, was mounted to the head. The recess center points were located equal distance from each other and were offset relative to the center of the head, such that when the head rotated, the center point of each triangular shaped recess would rotate in a circle having a 13.5 cm circumference. Three, C-plane sapphire wafers, 5.1 cm diameter×0.5 cm thick, were mounted in the carrier recesses and polished. Polishing time was 10 minutes. The slurry flow rate was set at 12 g/min and the slurry was dripped onto the pad at a point about 4 cm from the pad center. Wafers were measured gravimetrically before and after polishing. The measured weight loss was used to determine the amount of material removed, based on a wafer density of 3.97 g/cm$^3$. Removal rate, reported in microns/minute, is the average thickness reduction of the three wafers over the 10 minute polishing interval. Wafers were re-used for each 10 minute period. It is noted that, during the first 10 minutes of any given polishing experiment, the surface texture of the wafer might have had a roughness unrelated to the surface roughness developed on the wafer surface through the polishing process and associated slurry containing abrasive composites. Unless otherwise noted, a new pad was used for each slurry tested.

Polishing Test 2

Polishing was conducted using a Model FL-15 polishing tool with motor driven head, available from Engis Corporation, Wheeling, Ill. The load was applied using weights of 41.8 lbs (19 kg). A 14 inch (35.6 cm) diameter pad was mounted to the 14 inch (35.6 cm) diameter platen of the polisher using a double sided adhesive tape. The pad was mounted directly onto the platen such that the textured surface would contact the wafer being polished. The platen was rotated at 50 rpm. The head of the polisher was rotated at 40 rpm, without a sweeping motion. A carrier comprising three, equilateral, triangular shaped recesses, each sized to hold a 5.1 cm diameter wafer, was mounted to the head. The recess center points were located equal distance from each other and were offset relative to the center of the head, such that when the head rotated, the center point of each triangular shaped recess would rotate in a circle having a 13.5 cm circumference. Three, C-plane sapphire wafers, 5.1 cm diameter×0.5 cm thick, were mounted in the carrier recesses and polished. The slurry flow rate was set at about 1 g/min and the slurry was sprayed onto the pad at a point about 4 cm from the pad center, using a HYPREZ MINIMISER ENC-2 ELECTRONIC DISPENSER, available from Engis Corporation. The dispenser was pressurized to 15 psi with an interval of 30 sec and a duration of 4 sec. The polishing was 30 minutes. Wafers were measured gravimetrically before and after polishing. The measured weight loss was used to determine the amount of material removed, based on a wafer density of 3.97 g/cm$^3$. Removal rate, reported in microns/minute, is the average thickness reduction of the three wafers over the 30 minute polishing interval. Wafers were re-used for each 30 minute period. It is noted that, during the first 30 minutes of any given polishing experiment, the surface texture of the wafer might have had a roughness unrelated to the surface roughness developed on the wafer surface through the polishing process and associated slurry containing ceramic abrasive composites. Unless otherwise noted, a new pad was used for each slurry tested.

Polishing Test 3

Polishing was conducted using a LAPMASTER Model 15 polisher, available from Lapmaster International, Prospect Ill. A 14 inch (35.6 cm) diameter pad was mounted to the 14 inch (35.6 cm) diameter platen of the polisher using a double sided PSA. The platen was rotated at 50 rpm. The head of the polisher was rotated at 40 rpm, without a sweeping motion. A carrier comprising three, equilateral, triangular shaped recesses, each sized to hold a 5.1 cm diameter wafer, was mounted to the head. The recess center points were located equal distance from each other and were offset relative to the center of the head, such that when the head rotated, the center point of each triangular shaped recess would rotate in a circle having a 13.5 cm circumference. Three, C-plane sapphire wafers, 5.1 cm diameter×0.5 cm thick, were mounted in the carrier recesses and polished. Polishing time was 30 minutes. The load was applied to the wafers using either weights of 37.7 lbs (17.1 kg) or 75.4 lbs (34.2 kg) to achieve polishing pressure of 4 psi or 8 psi, respectively. The slurry flow rate was adjusted for each Example per Table 11 and sprayed onto the pad at a point about 4 cm from the pad center. Wafers were measured gravimetrically before and after polishing. The measured weight loss was used to determine the amount of material removed, based on a wafer density of 3.97 g/cm$^3$. Removal rate, reported in microns/minute, is the average thickness reduction of the three wafers over the 30 minute polishing interval. Wafers were re-used for each 30 minute period.

Surface Finish Test

After polishing, sapphire wafers were rinsed with deionized water and dried. Surface roughness measurements, including Ra, Rz and Rmax, were measured using a MAHR-PERTHAN PERTHOMETER model M4P available from University of North Carolina, Charlotte, N.C. The stylus travel was set at 1.5 cm and the scan rate was 0.5 mm/sec.

Preparation of Pad-1

Figure 4:
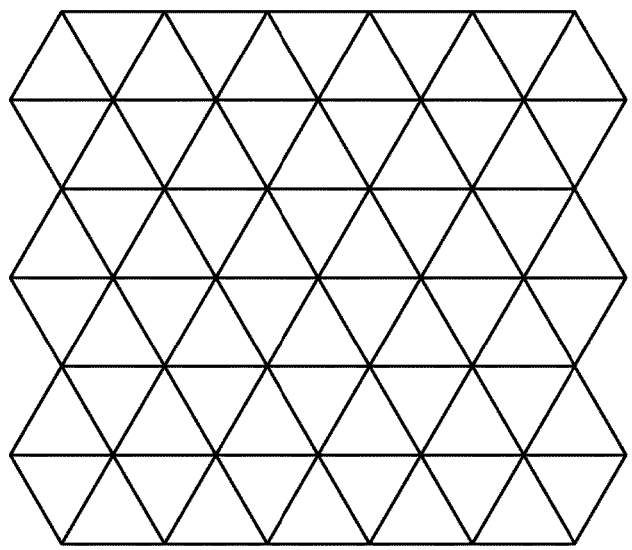
FIG. 4 illustrates a schematic top view of a polishing pad in accordance with some embodiments of the present disclosure, which includes an array of cavities having a three-sided pyramid shape.

Pad-1 was fabricated from a sheet of textured polypropylene, having an array of cavities. The cavities were three-sided pyramids having a depth of 63 microns and each side and, although not being identical, having a length of about 125 microns, and corner angles of 55.5 degrees, 59 degrees and 55.5 degrees. The pad surface included the pyramids' bases, with the pyramids' tips embedded 63 microns into the polypropylene sheet. The cavity array of the textured polypropylene sheet is shown in FIG. 4. The textured polypropylene sheet was die cut into a circle having a 12 inch (30.5 cm) diameter, Pad-1. The textured polypropylene sheet was formed by an embossing process, wherein the texture from a metal master tool, having the inverse texture of the desired polypropylene sheet, was formed into the polypropylene. The pyramidal array of the master tool was made by a conventional diamond turning process of a metal. Embossing of the polypropylene sheet via the master tool was conducted near the melting temperature of the polypropylene following conventional embossing techniques. The non-textured side of the polypropylene sheet was laminated to a first major surface of a first subpad. The first subpad was a 30 mil (0.762 mm) thick polycarbonate sheet with a double coated polyester tape laminated to both major surfaces. The tape is available under the trade designation 442DL from 3M Company, St. Paul, Minn. A second subpad, a 12 inch (30.5 cm) diameter sheet cut from a grooved IC1010 polishing pad, available from Dow Chemical Company, Midland, Mich., was then laminated to the second major surface of the first subpad, via the double coated polyester tape. The polishing surface of the IC1010 pad was laminated to the polycarbonate. The backside of the IC1010 pad included an adhesive and corresponding release liner. This adhesive was used to adhere the pad construction to the platen of a polishing tool.

Preparation of Pad-2

Pad-2 was fabricated similarly to Pad-1, except the cavities consisted of four side pyramidal shapes having square bases and a depth of 30 mils (0.762 mm). The geometry of Pad-2 is described in U.S. Pat. No. 7,267,700 (Collins, et. al.), which is incorporated herein by reference. Per FIG. 5 of U.S. Pat. No. 7,267,700, there is one cavity with a square base. The length of an edge of the square base was 1,693 microns. The distribution of the cavities was a horizontal-vertical grid array with a pitch of 1,763 microns. The master tool that produced this texture had the corresponding inverse texture as that of the polypropylene sheet. As described for Pad-1, the same multi-layer subpad (polycarbonate layer and IC1010 layer) was laminated to the non-textured side of the textured polypropylene sheet.

Preparation of Pad-3

Pad-3 was fabricated similarly to Pad-1, except the cavities consisted of inverse truncated square pyramids having a square shaped opening, the length of an edge of the square being 380 microns, and a depth of 355 microns. At the 355 micron depth, the length of an edge of the square shaped truncated pyramid top was 314 microns. The square pyramids were positioned in a horizontal-vertical grid array with a pitch of 594 microns. The master tool that produced this texture had the corresponding inverse texture as that of the polypropylene sheet. 442DL adhesive was laminated to the non-textured side of the textured polypropylene sheet.

Preparation of Pad-4

Pad-4 was fabricated from a 61 cm×61 cm sheet of polycarbonate having a thickness of 0.051 cm, available as LEXAN FILM from Sabic Innovative Plastics Holding, Schiller Park Ill. A 14 inch (35.6 cm) pad was die cut from the sheet of polycarbonate. As described for Pad-1, the same multi-layer subpad was laminated to one side of the polycarbonate sheet.

Preparation of Ceramic Abrasive Composite 1 (CAC-1)

Ceramic abrasive composites were prepared from an aqueous dispersion, using a spray drying technique, as follows. Standex230, 49 g, was added to 1,100 g of deionized water and stirred continuously. After 10 minutes, 720 g of GF, was added over a 1 minute time interval. Note that the GF was ground down to a particle size of about 4.2 microns, prior to use. MCD9, 880 g, was then added to the solution with continual stirring. The solution was then atomized in a centrifugal atomizer, a MOBILE MINER 2000 from GEA Process Engineering A/S, Soborg, Denmark. The atomization wheel was running at 20,000 rpm. Air was supplied at 200° C. into the atomization chamber and was used to dry the droplets as they formed, producing spray dried, ceramic abrasive composites. The collected composites were then combined with AlOx, forming a 65/35 composite/AlOx (wt./wt.) powder blend. The powder blend was vitrified at 750° C. for 1 hr. After cooling, the vitrified, ceramic abrasive composites were passed through a conventional sieve having openings of about 63 microns. The collected vitrified, ceramic abrasive composites, having a particle size of about 63 microns and less were designated as CAC-1.

Preparation of Ceramic Abrasive Composite 2 (CAC-2)

CAC-2 was prepared similarly to CAC-1, except MCD3 replaced MCD9. The collected vitrified, ceramic abrasive composites, having a particle size of about 63 microns and less were designated as CAC-2.

Preparation of Ceramic Abrasive Composite 3 (CAC-3)

CAC-3 was prepared similarly to CAC-1, except the vitrified agglomerate particles were passed through a conventional sieve having openings of about 109 microns. The collected vitrified agglomerate particles, having a particle size of about 109 microns and less were designated as CAC-3.

Preparation of Ceramic Abrasive Composite 4 (CAC-4)

CAC-4 was prepared similarly to CAC-1, except MCD1.5 replaced MCD9. The collected vitrified agglomerate particles, having a particle size of about 63 microns and less were designated as CAC-4.

Preparation of Ceramic Abrasive Composite 5 (CAC-5)

CAC-5 was prepared according to the general procedure described in U.S. Pat. No. 6,702,650 (Adefris), incorporated herein by reference, including column 13, line 65 through column 14, line 32. Note that the GF was the alumina-borosilicate glass which was ground down to a particle size of about 1.5 microns, prior to use. The ceramic abrasive composites formed were four-sided truncated pyramids.

Preparation of Ceramic Abrasive Composite 6 (CAC-6)

CAC-6 was prepared similarly to CAC-1, except PCD5 replaced MCD9. The collected vitrified agglomerate particles, having a particle size of about 63 microns and less were designated as CAC-6.

Preparation of Ceramic Abrasive Composite 7 (CAC-7)

CAC-7 was prepared similarly to CAC-3, except MCD6 replaced MCD9. The collected vitrified, ceramic abrasive composites, having a particle size of about 109 microns and less were designated as CAC-7.

Preparation of Ceramic Abrasive Composite 8 (CAC-8)

CAC-8 was prepared similarly to CAC-1, except the formulation was as follows: Standex230, 8 g, deionized water, 192 g, GF, 246 g and MCD3, 41 g. The collected vitrified agglomerate particles, having a particle size of about 63 microns and less were designated as CAC-8.

Preparation of Ceramic Abrasive Composite 9 (CAC-9)

CAC-9 was prepared similarly to CAC-8, except 216 g amount of GF and 72 g amount of MCD3 were used. The collected vitrified agglomerate particles, having a particle size of about 63 microns and less were designated as CAC-9.

Preparation of Ceramic Abrasive Composite 10 (CAC-10)

CAC-10 was prepared similarly to CAC-8, except 72 g amount of GF and 216 amount of MCD3 were used. The collected vitrified agglomerate particles, having a particle size of about 63 microns and less were designated as CAC-10.

Preparation of Ceramic Abrasive Composite 11 (CAC-11)

CAC-11 was prepared similarly to CAC-8, except 48 amount of GF and 240 amount of MCD3 were used. The collected vitrified agglomerate particles, having a particle size of about 63 microns and less were designated as CAC-11.

Preparation of Ceramic Abrasive Composite 12 (CAC-12)

CAC-12 was prepared similarly to CAC-8, except 26 amount of GF and 260 amount of MCD3 were used. The collected vitrified agglomerate particles, having a particle size of about 63 microns and less were designated as CAC-12.

Preparation of Abrasive Composite 13 (CAC-13)

CAC-13 was prepared similarly to CAC-8, except 18 amount of GF and 270 amount of MCD3 were used. The collected vitrified agglomerate particles, having a particle size of about 63 microns and less were designated as CAC-13.

Preparation of Ceramic Abrasive Composite 14 (CAC-14)

CAC-14 was prepared similarly to CAC-8, except 9 amount of GF and 279 amount of MCD3 were used. The collected vitrified agglomerate particles, having a particle size of about 63 microns and less were designated as CAC-14.

Preparation of Composite Bead 1 (CB-1)

Composite Bead 1 was prepared from the procedure described in U.S. Pat. No. 6,645,624 (Adefris, et. al.), incorporated herein by reference, per Example 1, with the 1 micron diamond replaced by MCD6. After firing, the particles were sieved to <63 um.

Preparation of Agglomerate 1 (Aggl-1)

Agglomerate 1 was prepared according to U.S. Pat. No. 7,399,330 (Schwabel, et. al.), incorporated herein by reference, as described in Column 19, line 19-27, of Examples 15-24 where 150 g of MCD3 was combined with 5 g of GF (as received). An air driven stirrer and blade were used in place of a Hobart Food Mixer. The mixture was heated at 5° C./min to 750° C. for 2 hrs, cooled and sieved to <63 microns.

Example 1

A slurry was prepared by forming an aqueous solution containing 10 g CAC-1, which includes about 65% by weight abrasive composite and about 35% by weight AlOx, 10 g HEC and 50 g Sabrelube and 1,000 g deionized (DI) water. The solution was mixed using a conventional high shear mixer for about 30 minutes prior to use.

Example 2

A slurry was prepared following the procedure of Example 1, except CAC-1 was replaced by CAC-2.

Using Polishing Test-1 in conjunction with Pad-1, removal rate data was obtained from polishing C-plane sapphire wafers using the slurries of Example 1 and Example 2. Results are shown in Table 1.

TABLE 1

|  | Polishing Time (minutes) | | | | | | | | | |
| --- | --- | --- | --- | --- | --- | --- | --- | --- | --- | --- |
|  | 10 | 20 | 30 | 40 | 50 | 60 | 70 | 80 | 90 | 100 |
| Ex. 1 Removal Rate (μm/minute) | 0.22 | 0.25 | 0.25 | 0.22 | 0.22 | 0.21 | — | — | — | — |
| Ex. 2 Removal Rate (μm/minute) | 0.22 | 0.21 | 0.20 | 0.20 | 0.19 | 0.17 | 0.15 | 0.16 | 0.16 | 0.14 |

Example 3

A slurry was prepared following the procedure of Example 1, except CAC-1 was replaced by CAC-3.

Example 4

A slurry was prepared by forming a non-aqueous solution containing 10 g CAC-3, 10 g HEC and 1,000 g EG. The solution was mixed using a conventional high shear mixer for about 30 minutes prior to use.

Example 5

A slurry was prepared following the procedure of Example 4, except CAC-3 was replaced by CAC-1.

Using Polishing Test-1 in conjunction with Pad-1, removal rate data was obtained from polishing C-plane sapphire wafers using the slurries of Example 3, Example 4 and Example 5. Results are shown in Table 2.

TABLE 2

|  | Polishing Time (minutes) | | | | | | | | | |
| --- | --- | --- | --- | --- | --- | --- | --- | --- | --- | --- |
|  | 10 | 20 | 30 | 40 | 50 | 60 | 70 | 80 | 90 | 100 |
| Ex. 3 Removal Rate ($\mu$m/minute) | 0.28 | 0.33 | 0.36 | 0.34 | 0.29 | 0.31 | 0.33 | 0.30 | 0.30 | 0.30 |
| Ex. 4 Removal Rate ($\mu$m/minute) | 0.86 | 0.94 | 0.92 | 0.92 | 0.97 | 0.98 | 0.97 | 0.93 | 0.90 | 0.66 |
| Ex. 5 Removal Rate ($\mu$m/minute) | 0.43 | 0.62 | 0.62 | 0.65 | 0.67 | — | — | — | — | — |

Example 6

A slurry was prepared following the procedure of Example 4, except CAC-3 was replaced by CAC-2.

Example 7

A slurry was prepared following the procedure of Example 4, except CAC-3 was replaced by CAC-4.

Using Polishing Test-1 in conjunction with Pad-1, removal rate data was obtained from polishing C-plane sapphire wafers using the slurries of Example 6, Example 7 and, for comparison purposes, Example 5. Results are shown in Table 3.

TABLE 3

|  | Polishing Time (minutes) | | | | |
| --- | --- | --- | --- | --- | --- |
|  | 10 | 20 | 30 | 40 | 50 |
| Ex. 5 Removal Rate ($\mu$m/minute) | 0.43 | 0.62 | 0.62 | 0.65 | 0.67 |
| Ex. 6 Removal Rate ($\mu$m/minute) | 0.89 | 1.00 | 1.06 | — | — |
| Ex. 7 Removal Rate ($\mu$m/minute) | 0.46 | 0.50 | 0.49 | 0.49 | 0.51 |

Example 8

A slurry was prepared by forming a non-aqueous solution containing 10 g CAC-3 and 1,000 g Glyc. The solution was mixed using a conventional high shear mixer for about 30 minutes prior to use.

Example 9

A slurry was prepared by forming a non-aqueous solution containing 10 g CAC-3, 100 g deionized water and 900 g Glyc. The solution was mixed using a conventional high shear mixer for about 30 minutes prior to use.

Example 10

A slurry was prepared following the procedure of Example 9 except 200 g deionized water and 800 g Glyc were used in place of 100 g of deionized water and 900 g Glyc.

Example 11

A slurry was prepared following the procedure of Example 9 except 300 g deionized water and 700 g Glyc were used in place of 100 g of deionized water and 900 g Glyc.

Using Polishing Test-1 in conjunction with Pad-1, removal rate data was obtained from polishing C-plane sapphire wafers using the slurries of Example 8 through Example 11. Results are shown in Table 4. Note, that only a single pad was used for the testing of Examples 8-11.

TABLE 4

|  | Polishing Time (minutes) | | | | | | | | | | | |
| --- | --- | --- | --- | --- | --- | --- | --- | --- | --- | --- | --- | --- |
|  | 10 | 20 | 30 | 40 | 50 | 60 | 70 | 80 | 90 | 100 | 110 | 120 |
| Ex. 8 Removal Rate ($\mu$m/minute) | 0.21 | 0.03 | — | — | — | — | — | — | — | — | — | — |
| Ex. 9 Removal Rate ($\mu$m/minute) | — | — | — | — | — | — | 0.41 | 0.40 | — | — | — | — |
| Ex. 10 Removal Rate ($\mu$m/minute) | — | — | 0.56 | 0.67 | 0.66 | 0.67 | — | — | — | — | — | — |

TABLE 4-continued

|  | Polishing Time (minutes) | | | | | | | | | | | |
| --- | --- | --- | --- | --- | --- | --- | --- | --- | --- | --- | --- | --- |
|  | 10 | 20 | 30 | 40 | 50 | 60 | 70 | 80 | 90 | 100 | 110 | 120 |
| Ex. 11 Removal Rate (μm/minute) | — | — | — | — | — | — | — | — | 0.69 | 0.69 | 0.64 | 0.63 |

Example 12

A slurry was prepared by forming non-aqueous solution containing 10 g CAC-5, and 10 g of HEC and 1,000 g of EG. The solution was mixed using a conventional high shear mixer for about 30 minutes prior to use.

Using Polishing Test-1 in conjunction with Pad-2, removal rate data was obtained from polishing C-plane sapphire wafers using the slurry of Example 12. Results are shown in Table 5.

TABLE 5

|  | Polishing Time (minutes) | | | | |
| --- | --- | --- | --- | --- | --- |
|  | 10 | 20 | 30 | 40 | 50 |
| Ex. 12 Removal Rate (μm/minute) | 3.14 | 4.58 | 4.36 | 4.17 | 3.89 |

Example 13

A slurry was prepared by forming a non-aqueous solution containing 10 g CAC-6, and 1,000 g EG. The solution was mixed using a conventional high shear mixer for about 30 minutes prior to use.

Using Polishing Test-1 in conjunction with Pad-1, removal rate data was obtained from polishing C-plane sapphire wafers using the slurry of Example 13. Results are shown in Table 6.

TABLE 6

|  | Polishing Time (minutes) | | | | |
| --- | --- | --- | --- | --- | --- |
|  | 10 | 20 | 30 | 40 | 50 |
| Ex. 13 Removal Rate (μm/minute) | 0.65 | 0.76 | 0.75 | 0.76 | 0.76 |

Using the Surface Finish Test, the surface finish obtained on sapphire wafers from several of the above polishing tests was measured. Values are reported in Table 7.

TABLE 7

| Example | Ra (μm) | Rz (μm) | Rmax (μm) |
| --- | --- | --- | --- |
| 4 | 0.05 | 0.42 | 0.50 |
| 5 | 0.05 | 0.48 | 1.04 |
| 6 | 0.04 | 0.38 | 0.70 |
| 7 | 0.02 | 0.20 | 0.29 |
| 12 | 0.37 | 3.67 | 5.0 |
| 13 | 0.03 | 0.28 | 0.35 |

Example 14

A slurry was prepared by forming a non-aqueous solution containing 10 g CAC-7 and 1,000 g EG. The solution was mixed using a conventional high shear mixer for about 30 minutes prior to use.

Comparative Example 15 (CE-15)

A slurry was prepared following the procedure of Example 14, except CAC-7 was replaced by CB-1.

Using Polishing Test-2 in conjunction with Pad-3, removal rate data was obtained from polishing C-plane sapphire wafers using the slurry of Example 14 and CE-15. Results are shown in Table 8.

TABLE 8

|  | Polishing Time (minutes) | | | |
| --- | --- | --- | --- | --- |
|  | 30 | 60 | 90 | 120 |
| Ex. 14 Removal Rate (μm/minute) | 0.29 | 0.86 | 0.92 | 0.92 |
| CE-15 Rate (μm/minute) | .06 | .06 | .05 | — |

Example 16

A slurry was prepared following the procedure of Example 14, except CAC-7 was replaced by CAC-2.

Comparative Example 17 (CE-17)

A slurry was prepared following the procedure of Example 14, except CAC-7 was replaced by Aggl-1.

Using Polishing Test-2 in conjunction with Pad-3, removal rate data was obtained from polishing C-plane sapphire wafers using the slurry of Example 16 and CE-17. Results are shown in Table 9.

TABLE 9

|  | Polishing Time (minutes) | | | | | |
| --- | --- | --- | --- | --- | --- | --- |
|  | 30 | 60 | 90 | 120 | 150 | 180 |
| Ex. 16 Removal Rate (μm/minute) | — | — | — | 1.27 | 1.40 | 1.47 |
| CE-17 Rate (μm/minute) | 0.44 | 0.42 | 0.38 | — | — | — |

Example 18

A slurry was prepared following the procedure of Example 14, except CAC-7 was replaced by CAC-8.

Example 19

A slurry was prepared following the procedure of Example 14, except CAC-7 was replaced by CAC-9.

Example 20

A slurry was prepared following the procedure of Example 14, except CAC-7 was replaced by CAC-2.

Example 21

A slurry was prepared following the procedure of Example 14, except CAC-7 was replaced by CAC-10.

Example 22

A slurry was prepared following the procedure of Example 14, except CAC-7 was replaced by CAC-11.

Example 23

A slurry was prepared following the procedure of Example 14, except CAC-7 was replaced by CAC-12.

Example 24

A slurry was prepared following the procedure of Examples 14, except CAC-7 was replaced by CAC-13.

Example 25

A slurry was prepared following the procedure of Example 14, except CAC-7 was replaced by CAC-14.

Using Polishing Test-1 in conjunction with Pad-1, removal rate data was obtained from polishing C-plane sapphire wafers using the slurry of Examples 18, 19, 21-25. Using Polishing Test-3 in conjunction with Pad-1, removal rate data was obtained from polishing C-plane sapphire wafers using the slurry of Example 20. Results are shown in Table 10.

TABLE 10

|  | Polishing Time (minutes) | | | | |
| --- | --- | --- | --- | --- | --- |
|  | 30 | 60 | 90 | 120 | Average* |
| Ex. 18 Removal Rate (μm/minute) | 0.76 | 0.81 | 0.80 | 0.80 | 0.79 |
| Ex. 19 Removal Rate (μm/minute) | 0.79 | 0.80 | 0.94 | 0.97 | 0.88 |
| Ex. 20 Removal Rate (μm/minute) | 0.85 | 0.81 | 0.84 | 0.82 | 0.83 |
| Ex. 21 Removal Rate (μm/minute) | 0.79 | 0.72 | 0.67 | 0.61 | 0.7 |
| Ex. 22 Removal Rate (μm/minute) | 0.37 | 0.35 | 0.36 | 0.36 | 0.36 |
| Ex. 23 Removal Rate (μm/minute) | 0.30 | 0.27 | 0.22 | 0.20 | 0.25 |
| Ex. 24 Removal Rate (μm/minute) | 0.19 | 0.15 | 0.16 | 0.12 | 0.15 |
| Ex. 25 Removal Rate (μm/minute) | 0.14 | 0.13 | 0.13 | 0.14 | 0.14 |

*Average of four data points.

Examples 26-66

Examples 26 through 76 were prepared by mixing the appropriate amount of CAC-2 with EG1. The solution was mixed using a conventional high shear mixer for about 30 minutes prior to use. The concentration of CAC-2 in the slurry, on a weight basis, was adjusted for each Example according to Table 11. The rate at which CAC-2 was applied to the pad, in mg/min, is also shown in Table 11. It is obtained by multiplying the slurry flow rate (g/min) by the concentration of CAC-2 in the slurry and then multiplying by 1,000. For example the, the CAC-2 rate (mg/min) of Example 31 is calculated as follows: 0.005 g CAC-2/per g slurry×1 g slurry/min×1,000 mg/g=5 mg/min. The rate at which CAC-2 was applied to the pad was also normalized with respect to the pad surface area, 0.10 m². For example, the rate at which CAC-2 was applied to the polishing pad, normalized to the pad surface area, for Example 31 was 50 (mg/min)/m².

Using Polishing Test-3 in conjunction with Pad-4, removal rate data was obtained from polishing C-plane sapphire wafers using the slurries of Example 26-66. Results are shown in Table 11.

TABLE 11

| Example | Wafer Pressure (psi) | CAC-2 Concentration (wt. %) | Slurry Flow Rate (g/min) | CAC-2 Rate (mg/min) | CAC-2 Rate* (mg/min)/m² | Removal Rate (μm/min) |
| --- | --- | --- | --- | --- | --- | --- |
| 26 | 4 | 0.17 | 3 | 5 | 50 | 0.24 |
| 27 | 4 | 0.25 | 0.5 | 1.25 | 12.5 | 0.34 |
| 28 | 4 | 0.25 | 1 | 2.5 | 25 | 0.5 |
| 29 | 4 | 0.50 | 3 | 15 | 150 | 0.5 |
| 30 | 4 | 0.83 | 3 | 25 | 250 | 0.71 |
| 31 | 4 | 1.00 | 0.5 | 5 | 50 | 0.5 |
| 32 | 4 | 1.00 | 1 | 10 | 100 | 0.85 |
| 33 | 4 | 1.00 | 3 | 30 | 300 | 0.86 |
| 34 | 4 | 1.50 | 1 | 15 | 150 | 1.09 |
| 35 | 4 | 1.50 | 3 | 45 | 450 | 1.08 |
| 36 | 4 | 2.00 | 0.5 | 10 | 100 | 1.05 |
| 37 | 4 | 2.00 | 1 | 20 | 200 | 0.2 |
| 38 | 4 | 2.00 | 3 | 60 | 600 | 0.22 |
| 39 | 4 | 4.00 | 0.5 | 20 | 200 | 0.19 |
| 40 | 4 | 4.00 | 1 | 40 | 400 | 0.16 |
| 41 | 4 | 4.00 | 3 | 120 | 1,200 | 0.14 |
| 42 | 4 | 8.00 | 0.5 | 40 | 400 | 0.16 |
| 43 | 4 | 8.00 | 1 | 80 | 800 | 0.13 |
| 44 | 4 | 8.00 | 3 | 240 | 2,400 | 0.13 |
| 45 | 6 | 0.50 | 1 | 5 | 50 | 0.49 |
| 46 | 6 | 1.00 | 1 | 10 | 100 | 0.83 |

TABLE 11-continued

| Example | Wafer Pressure (psi) | CAC-2 Concentration (wt. %) | Slurry Flow Rate (g/min) | CAC-2 Rate (mg/min) | CAC-2 Rate* (mg/min)/m² | Removal Rate (μm/min) |
|---|---|---|---|---|---|---|
| 47 | 6 | 2.00 | 1 | 20 | 200 | 1.37 |
| 48 | 8 | 0.50 | 0.5 | 2.5 | 25 | 0.32 |
| 49 | 8 | 0.50 | 1 | 5 | 50 | 0.52 |
| 50 | 8 | 0.50 | 3 | 15 | 150 | 0.42 |
| 51 | 8 | 1.00 | 0.5 | 5 | 50 | 0.53 |
| 52 | 8 | 1.00 | 1 | 10 | 100 | 0.8 |
| 53 | 8 | 1.00 | 3 | 30 | 300 | 0.93 |
| 54 | 8 | 1.50 | 3 | 45 | 450 | 1.28 |
| 55 | 8 | 2.00 | 0.5 | 10 | 100 | 1.44 |
| 56 | 8 | 2.00 | 1 | 20 | 200 | 1.31 |
| 57 | 8 | 2.00 | 3 | 60 | 600 | 1.46 |
| 58 | 8 | 3.00 | 0.5 | 15 | 150 | 1.28 |
| 59 | 8 | 3.00 | 1 | 30 | 300 | 1.49 |
| 60 | 8 | 3.00 | 3 | 90 | 900 | 1.37 |
| 61 | 8 | 4.00 | 0.5 | 20 | 200 | 0.81 |
| 62 | 8 | 4.00 | 1 | 40 | 400 | 1.39 |
| 63 | 8 | 4.00 | 3 | 120 | 1,200 | 0.98 |
| 64 | 8 | 8.00 | 0.5 | 40 | 400 | 0.49 |
| 65 | 8 | 8.00 | 1 | 80 | 800 | 0.55 |
| 66 | 8 | 8.00 | 3 | 240 | 2,400 | 0.22 |

*Normalized with respect to the pad surface area.

Other embodiments of the invention are within the scope of the appended claims.

What is claimed is:

1. A polishing solution comprising:
a fluid component; and
a plurality of ceramic abrasive composites, the ceramic abrasive composites comprising individual abrasive particles uniformly dispersed throughout a porous ceramic matrix;
wherein at least a portion of the porous ceramic matrix comprises glassy ceramic material;
wherein the ceramic abrasive composites are dispersed in the fluid component; and
wherein the fluid component comprises ethylene glycol, propylene glycol, glycerol, or oligomers of ethylene glycol; and
wherein the fluid component comprises a non-aqueous fluid in an amount of at least 50% by weight.

2. The polishing solution of claim 1, wherein the fluid component is aqueous.

3. The polishing solution of claim 1, wherein the fluid component is non-aqueous.

4. The polishing solution of claim 1, wherein the ceramic abrasive composites have a pore volume ranging from about 4-70%.

5. The polishing solution of claim 1, wherein the abrasive particles comprise diamond, cubic boron nitride, fused aluminum oxide, ceramic aluminum oxide, heated treated aluminum oxide, silicon carbide, boron carbide, alumina zirconia, iron oxide, ceria, or garnet.

6. The polishing solution of claim 1, wherein the abrasive particles comprise diamond.

7. The polishing solution of claim 1, wherein the ceramic abrasive composites have an average particle size of less than 500 microns.

8. The polishing solution of claim 1, wherein the average size of the ceramic abrasive composites is at least about 5 times the average size of the abrasive particles.

9. The polishing solution of claim 1, wherein the porous ceramic matrix comprises glass comprising aluminum oxide, boron oxide, silicon oxide, magnesium oxide, sodium oxide, manganese oxide, or zinc oxide.

10. The polishing solution of claim 1, wherein the concentration of the abrasive composites in the fluid component is between 0.065% and 6.5% by weight.

11. The polishing solution of claim 1, wherein the porous ceramic matrix comprises at least 50% by weight glassy ceramic material.

12. The polishing solution of claim 1, wherein the porous ceramic matrix consists essentially of glassy ceramic material.

13. A method of polishing a substrate, the method comprising:
providing a polishing pad;
providing a substrate having a major surface to be polished; and
contacting said surface with the polishing pad and a polishing solution while there is relative motion between the polishing pad and the substrate;
wherein the polishing solution comprises:
a fluid component; and
a plurality of ceramic abrasive composites, the ceramic abrasive composites comprising individual abrasive particles uniformly dispersed throughout a porous ceramic matrix;
wherein at least a portion of the porous ceramic matrix comprises glassy ceramic material;
wherein the ceramic abrasive composites are dispersed in the fluid component; and
wherein the fluid component comprises ethylene glycol, propylene glycol, glycerol, or oligomers of ethylene glycol; and
wherein the fluid component comprises a non-aqueous fluid in an amount of at least 50% by weight.

14. A polishing system comprising a polishing pad and a polishing solution, wherein the polishing solution comprises:
a fluid component; and
a plurality of ceramic abrasive composites, the ceramic abrasive composites comprising individual abrasive particles uniformly dispersed throughout a porous ceramic matrix;
wherein at least a portion of the porous ceramic matrix comprises glassy ceramic material;

wherein the ceramic abrasive composites are dispersed in the fluid component; and wherein the fluid component comprises ethylene glycol, propylene glycol, glycerol, or oligomers of ethylene glycol; and wherein the fluid component comprises a non-aqueous fluid in an amount of at least 50% by weight.

* * * * *

UNITED STATES PATENT AND TRADEMARK OFFICE
CERTIFICATE OF CORRECTION

PATENT NO. : 10,293,458 B2
APPLICATION NO. : 14/915651
DATED : May 21, 2019
INVENTOR(S) : Lugg et al.

It is certified that error appears in the above-identified patent and that said Letters Patent is hereby corrected as shown below:

In the Specification

Column 1, Line 23, Delete "17-20," and insert -- 17-20th, --, therefor.

Column 1, Line 25, Delete "23th" and insert -- 23rd --, therefor.

Column 5, Line 63, Delete "tier" and insert -- for --, therefor.

Column 6, Line 1, Delete "polyimide," and insert -- polyamide, --, therefor. (Second Occurrence)

Column 7, Line 11, Delete "the" and insert -- for --, therefor.

Column 8, Line 57, Delete "thicknening" and insert -- thickening --, therefor.

Column 9, Line 59, After "the" insert -- pH --.

Column 9, Lines 64-65, Delete "acid-ammoniurn" and insert -- acid-ammonium --, therefor.

Column 10, Line 10, Delete "polypropylene" and insert -- poly(propylene --, therefor.

Column 10, Line 11, Delete "polypropylene" and insert -- poly(propylene --, therefor.

Column 10, Lines 39-40, Delete "non-aqueousliquids" and insert -- non-aqueous liquids --, therefor.

Column 10, Line 53, Delete "ethylenediaminetetraacetie" and insert -- ethylenediaminetetraacetic --, therefor.

Column 10, Line 67, Delete "triearboxylic" and insert -- tricarboxylic --, therefor.

Column 11, Line 8, After "stearic," insert -- oleic, --.

Signed and Sealed this
Seventeenth Day of March, 2020

Andrei Iancu
*Director of the United States Patent and Trademark Office*

CERTIFICATE OF CORRECTION (continued)
U.S. Pat. No. 10,293,458 B2

Column 11, Line 21, Delete "monoffinctionat" and insert -- monofunctional --, therefor.

Column 11, Line 28, Delete "(difunctionat" and insert -- (difunctional --, therefor.

Column 16, Line 2, Delete "oetyltriethoxysilane," and insert -- octyltriethoxysilane, --, therefor.

Column 16, Line 3, Delete "vinyltritnethoxysilane" and insert -- vinyltrimethoxysilane --, therefor.

Column 16, Lines 3-4, Delete "triethoxysitane)," and insert -- triethoxysilane), --, therefor.

Column 16, Lines 5-6, Delete "propyltrimethoxysilane," and insert -- propyltriethoxysilane, --, therefor.

Column 16, Line 6, Delete "tris[3-(trimethoxysityl)" and insert -- tris-[3-(trimethoxysilyl) --, therefor.

Column 16, Line 10, Delete "glycidoxypropyltrimethhoxysilane" and insert -- glycidoxypropyltrimethoxysilane --, therefor.

Column 16, Line 12, Delete "aminopropyltrimethoxysilane," and insert -- aminopropyltriethoxysilane, --, therefor.

Column 16, Line 15, Delete "trimethoxylpropyl)" and insert -- trimethoxysilylpropyl) --, therefor.

Column 16, Line 19, Delete "methaeryloxyalkyl" and insert -- methacryloxyalkyl --, therefor.

Column 16, Line 26, Delete "teat gent" and insert -- treatment --, therefor.

Column 18, Line 57, Delete "ENC-2" and insert -- EMC-2 --, therefor.